(12) United States Patent
Pao

(10) Patent No.: US 7,043,425 B2
(45) Date of Patent: ***May 9, 2006

(54) MODEL ADAPTIVE APPARATUS AND MODEL ADAPTIVE METHOD, RECORDING MEDIUM, AND PATTERN RECOGNITION APPARATUS

(75) Inventor: Hongchang Pao, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/090,815

(22) Filed: Mar. 24, 2005

(65) Prior Publication Data

US 2005/0171767 A1 Aug. 4, 2005

Related U.S. Application Data

(63) Continuation of application No. 09/748,471, filed on Dec. 26, 2000, now Pat. No. 6,920,421.

(30) Foreign Application Priority Data

Dec. 28, 1999 (JP) ................................. 11-375766

(51) Int. Cl.
*G10L 19/14* (2006.01)
(52) U.S. Cl. ....................................... 704/211; 704/252
(58) Field of Classification Search ................ 704/211, 704/252, 256
See application file for complete search history.

(56) References Cited

U.S. PATENT DOCUMENTS

| 4,718,088 A | 1/1988 | Baker et al. |
| 4,718,092 A | 1/1988 | Klovstad |
| 4,718,093 A | 1/1988 | Brown |
| 4,852,181 A | 7/1989 | Morito et al. |
| 5,572,624 A | 11/1996 | Sejnoha |
| 5,590,242 A | 12/1996 | Juang et al. |
| 5,793,891 A | 8/1998 | Takahashi et al. |

FOREIGN PATENT DOCUMENTS

| EP | 0 522 213 | 1/1993 |
| EP | 0 694 906 | 1/1996 |

OTHER PUBLICATIONS

Taewon Yang et al: "On robust Kalman filtering with forgetting factor for sequential speech analysis" Signal Processing European Journal Devoted to the Methods and Applications of Signal Processing, NL, Elsevier Science Publishers B.V. Amsterdam, vol. 63, No. 2, Dec. 1, 1997, pp. 151-156, XP004102259 ISBN: 0165-1684.

N. Iwahashi et al: "Stochastic features for noise robust speech recognition" IEEE International Conference on Acoustics, Speech and Signal Processing, US, New York, NY: IEEE, vol. Conf. 23, May 12, 1998, pp. 633-636, XP002130090, ISBN: 0-7803-4429-4.

*Primary Examiner*—W. R. Young
*Assistant Examiner*—Michael N. Opsasnick
(74) *Attorney, Agent, or Firm*—Frommer Lawrence & Haug LLP; William S. Frommer

(57) ABSTRACT

In order to improve recognition performance, a no-speech sound model correction section performs an adaptation of a no-speech sound model which is a sound model representing a no-speech state on the basis of input data observed in an interval immediately before a speech recognition interval for the object of speech recognition and the degree of freshness representing the recentness of the input data.

1 Claim, 13 Drawing Sheets

7

U.S. PATENT DOCUMENTS

| | | |
|---|---|---|
| 5,812,972 A | 9/1998 | Juang et al. |
| 5,999,902 A | 12/1999 | Scahill et al. |
| 6,070,140 A | 5/2000 | Tran |
| 6,151,573 A | 11/2000 | Gong |
| 6,418,411 B1 | 7/2002 | Gong |
| 6,490,327 B1 | 12/2002 | Shah |
| 6,633,843 B1 | 10/2003 | Gong |

000 # MODEL ADAPTIVE APPARATUS AND MODEL ADAPTIVE METHOD, RECORDING MEDIUM, AND PATTERN RECOGNITION APPARATUS

This is a continuation of application Ser. No. 09/748,471, filed Dec. 26, 2000, now U.S. Pat. No. 6,920,421 the entirety of which is incorporated herein by reference.

BACKGROUND OF THE INVENTION

1. Field of the Invention

The present invention relates to a model adaptive apparatus and a model adaptive method, a recording medium, and a pattern recognition apparatus. More particularly, the present invention relates to a model adaptive apparatus and a model adaptive method, a recording medium, and a pattern recognition apparatus, which are suitable for use in a case in which, for example, speech recognition is performed.

2. Description of the Related Art

There have hitherto been known methods of recognizing words which are spoken in a noisy environment. Typical methods thereof are a PMC (Parallel Model Combination) method, an SS/NSS (Spectral Subtraction/Nonlinear Spectral Subtraction) method, an SFE (Stochastic Feature Extraction) method, etc.

The PMC method has satisfactory recognition performance because information on environmental noise is taken directly into a sound model, but calculation costs are high (since high-level computations are necessary, the apparatus is large, processing takes a long time, etc.). In the SS/NSS method, at a stage in which features of speech data are extracted, environmental noise is removed. Therefore, the SS/NSS method has a lower calculation cost than that of the PMC method and is widely used at the present time. In the SFE method, in a manner similar to the SS/NSS method, at a stage in which features of a speech signal containing environmental noise are extracted, the environmental noise is removed, and as features, those represented by a probability distribution are extracted. The SFE method, as described above, differs from the SS/NSS method and the PMC method in which the features of speech are extracted as a point on the feature space, in that the features of speech are extracted as a distribution in the feature space.

In each of the above-described methods, after the extraction of the features of speech, it is determined which one of the sound models corresponding to plural words, which are registered in advance, the features match best, and the word corresponding to the sound model which matches best is output as a recognition result.

The details of the SFE method are described in Japanese Unexamined Patent Application Publication No. 11-133992 (Japanese Patent Application No. 9-300979), etc., which was previously submitted by the applicant of this application. Furthermore, the details of the performance comparisons, etc., among the PMC method, the SS/NSS method, and the SFE method are described in, for example, "H. Pao, H. Honda, K. Minamino, M. Omote, H. Ogawa and N. Iwahashi, Stochastic Feature Extraction for Improving Noise Robustness in Speech Recognition, Proceedings of the 8th Sony Research Forum, SRF98-234, pp. 9–14, October 1998"; "N. Iwahashi, H. Pao, H. Honda, K. Minamino, and M. Omote, Stochastic Features for Noise Robust in Speech Recognition, ICASSP'98 Proceedings, pp. 633–636, May 1998"; "N. Iwahashi, H. Pao (presenter), H. Honda, K. Minamino and M. Omote, Noise Robust Speech Recognition Using Stochastic Representation of Features, ASJ'98- Spring Proceedings, pp. 91–92, March 1998"; "N. Iwahashi, H. Pao, H. Honda, K. Minamino and M. Omote, Stochastic Representation of Features for Noise Robust Speech Recognition, Technical Report of IEICE, pp. 19–24, SP97-97 (1998–01); etc.

In the above-described SFE method, etc., environmental noise is not taken into account directly at the stage of speech recognition, that is, information of environmental noise is not input directly into a no-speech sound model, causing a problem of inferior recognition performance to occur.

Furthermore, due to the fact that information on environmental noise is not taken directly into a no-speech sound model, there is another problem in that recognition performance is decreased as the time from the start of the speech recognition until the start of speech production is increased.

SUMMARY OF THE INVENTION

The present invention has been achieved in view of such circumstances. An object of the present invention is to prevent a decrease in recognition performance as the time from the start of speech recognition until the start of speech production is increased by correcting a no-speech sound model by using environmental noise information.

To achieve the above-mentioned object, in a first aspect, the present invention provides a model adaptive apparatus comprising model adaptation means for performing an adaptation of a predetermined model used in pattern recognition on the basis of extracted data in a predetermined interval and the degree of freshness representing the recentness of the extracted data.

The pattern recognition may be performed based on a feature distribution in a feature space of input data.

The model adaptation means may perform an adaptation of the predetermined model by using, as an degree of freshness, a function in which the value changes in such a manner as to correspond to the time-related position of the extracted data in the predetermined interval.

The function may be a monotonically increasing function which increases as time elapses.

The function may be a linear or nonlinear function.

The function may take discrete values or continuous values.

The function may be a second-order function, a third-order function, or a higher-order function.

The function may be a logarithmic function.

The input data may be speech data.

The predetermined model may be a sound model representing noise in an interval which is not a speech segment.

Data extraction means may optionally comprise:
  framing means having an input for receiving a source of speech and/or environmental noise and for producing in response data frames;
  noise observation interval extraction means for extracting a noise vector for a number (m) of frames in, a noise observation interval;
  feature extraction means responsive to the noise vector (a) and to an observation vector in a speech recognition interval to produce a feature vector (y); and
  no-speech sound model correction means responsive to the noise vector.

In an embodiment, the apparatus may optionally also comprise:
  power spectrum analysis means for receiving the extracted data;
  noise characteristic calculation means responsive to environmental noise; and feature distribution parameter calculation means for producing a feature distribution parameter in response to the power spectrum analysis means and the noise characteristic calculation means.

The apparatus of the above embodiment may optionally further comprise:

a plurality of identification function computation means of which one at least receives a no-speech model, the means receiving the feature distribution parameter and producing in response a respective identification function; and determination means responsive to the identification functions to produce a recognition result on the basis of a closest match.

The apparatus may optionally comprise:

feature extraction means for extracting the features of the input data;

storage means for storing a predetermined number of models into which the input data is to be classified; and classification means for classifying the features of the input data, corresponding to a predetermined model, which is observed in a predetermined interval, and for outputting the data as extracted data.

In a second aspect, the present invention provides a model adaptive method comprising a model adaptation step of performing an adaptation of a predetermined model on the basis of the extracted data in a predetermined interval and the degree of freshness representing the recentness of the extracted data.

In a third aspect, the present invention provides a recording medium having recorded therein a program comprising a model adaptation step of performing an adaptation of a predetermined model on the basis of extracted data in a predetermined interval and the degree of freshness representing the recentness of the extracted data.

In a fourth aspect, the present invention provides a pattern recognition apparatus comprising model adaptation means for performing an adaptation of a predetermined model on the basis of extracted data in a predetermined interval and the degree of freshness representing the recentness of the extracted data.

In the model adaptive apparatus and the model adaptive method, the recording medium, and the pattern recognition apparatus of the present invention, an adaptation of a predetermined model is performed based on extracted data in a predetermined interval and the degree of freshness representing the recentness of the extracted data.

The above and further objects, aspects and novel features of the invention will become more fully apparent from the following detailed description when read in conjunction with the accompanying drawings.

DESCRIPTION OF THE PREFERRED EMBODIMENT

Figure 1:
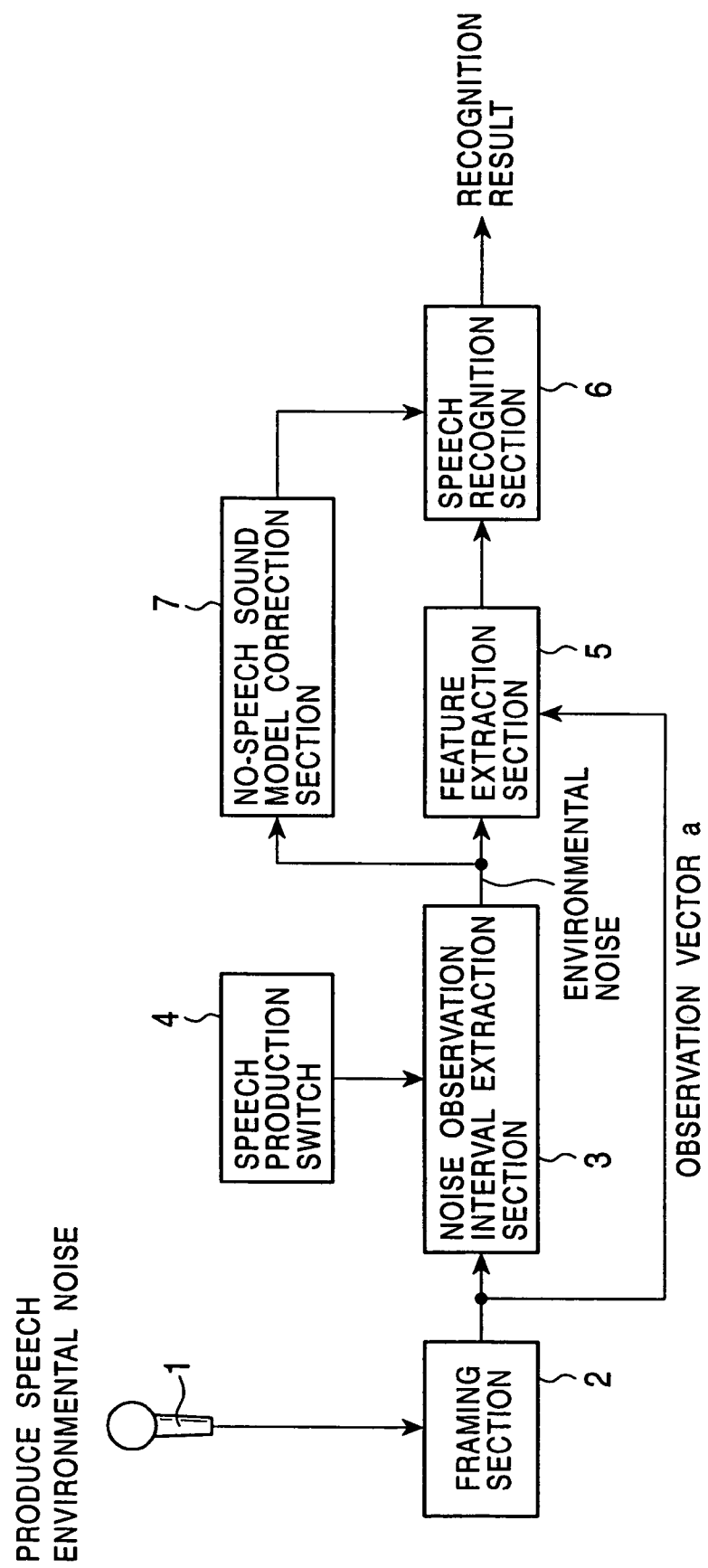
FIG. 1 is a block diagram showing an example of the construction of a speech recognition apparatus according to the present invention.

FIG. 1 shows an example of the construction of an embodiment of a speech recognition apparatus according to the present invention. In this speech recognition apparatus, a microphone 1 collects produced speech which is the object for recognition, together with environmental noise, and outputs it to a framing section 2. The framing section 2 extracts speech data input from the microphone 1 at a predetermined time interval (for example, 10 milliseconds), and outputs the extracted data as data of one frame. The speech data in units of one frame, which is output by the framing section 2, is supplied, as an observation vector "a" in which each of the speech data in a time series which form that frame is a component, to a noise observation interval extraction section 3 and to a feature extraction section 5. Hereinafter, where appropriate, an observation vector which is speech data of a t-th frame is denoted as a(t).

The noise observation interval extraction section 3 buffers the speech data in frame units, which is input from the framing section 2, by an amount of a predetermined time (by an amount of M or more frames), extracts an observation vector "a" for M frames in a noise observation interval Tn which is from a timing $t_b$ at which a speech production switch 4 is turned on to a tuning ta which is previous by an amount of M frames, and outputs it to the feature extraction section 5 and a no-speech sound model correction section 7.

The speech production switch 4 is turned on by a user when the user starts to produce speech and is turned off when the speech production is terminated. Therefore, the produced speech is not contained in the speech data before tiling $t_b$ (noise observation interval Tn) at which the speech production switch 4 is turned on, and only environmental noise is present. Furthermore, the interval from the timing $t_b$ at which the speech production switch 4 is turned on to a timing $t_d$ at which the speech production switch 4 is turned off is a speech recognition interval, and the speech data in that speech recognition interval is an object for speech recognition.

The feature extraction section 5 removes the environmental noise components from the observation vector "a" in the speech recognition interval after timing $t_b$, which is input from the framing section 2, on the basis of the speech data in which only the environmental noise in the noise observation interval Tn, which is input from the noise observation interval extraction section 3, is present, and extracts the features. That is, the feature extraction section 5 performs a Fourier transform on, for example, the true (the environmental noise is free removed) speech data as the observation vector "a" in order to determine the power spectrum thereof, and calculates a feature vector y in which each frequency component of the power spectrum is a component. The method of calculating the power spectrum is not limited to a method using a Fourier transform. That is, in addition, the power spectrum can be determined, for example, by what is commonly called a filter bank method.

In addition, the feature extraction section 5 calculates a parameter (hereinafter referred to as a "feature distribution parameter") Z representing the distribution in a feature vector space, which is obtained when speech contained in speech data as an observation vector "a" is mapped into a space (the feature vector space) of the features, on the basis of the calculated feature vector y, and supplies it to the speech recognition section 6.

Figure 3:
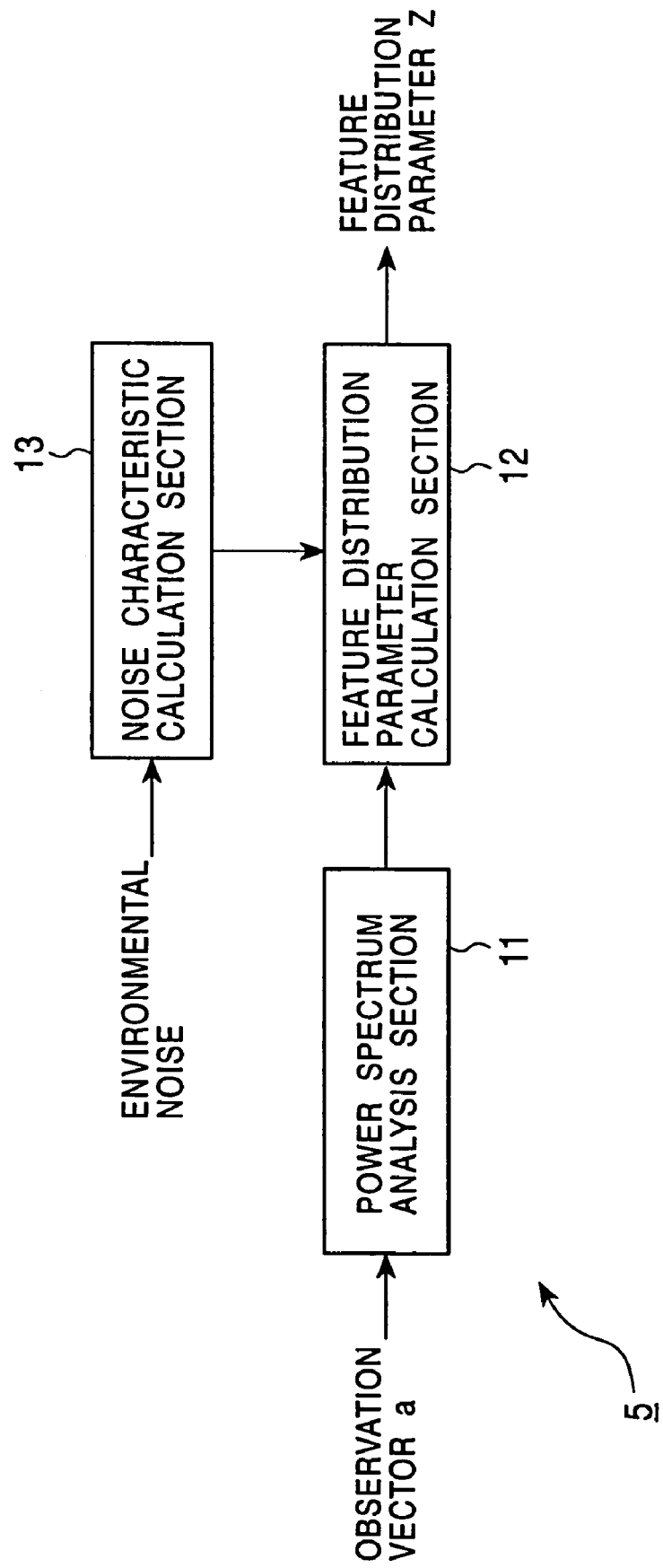
FIG. 3 is a block diagram showing a detailed example of the construction of a feature extraction section 5 of FIG. 1.

FIG. 3 shows a detailed example of the construction of the feature extraction section 5 of FIG. 1. In the feature extraction section 5, the observation vector "a" input from the framing section 2 is supplied to a power spectrum analysis section 11. In the power spectrum analysis section 11, the observation vector "a" is subjected to a Fourier transform by, for example, an FFT (Fast Fourier Transform) algorithm, thereby the, power spectrum of the speech is extracted as a feature vector. Herein, it is assumed that the observation vector "a" as speech data of one frame is converted into a feature vector (D-dimensional feature vector) formed of D components.

Here, a feature vector obtained from an observation vector a(t) of the t-th frame is denoted as y(t). Furthermore, of the feature vector y(t), the spectrum component of the true speech is denoted as x(t), and the spectrum component of environmental noise is denoted as u(t). In this case, the spectrum component of the true speech can be expressed based on the following equation (1):

$$x(t) = y(t) - u(t) \quad (1)$$

wherein it is assumed that the environmental noise has irregular characteristics, and that the speech data as the observation vector a(t) is such that the environmental noise is added to the true speech component.

In the feature extraction section 5, on the other hand, the environmental noise while or in the form of the speech data input from the noise observation interval extraction section 3 is input to the noise characteristic calculation section 13. In the noise characteristic calculation section 13, the characteristics of the environmental noise in the noise observation interval Tn are determined.

More specifically, herein, assuming that the distribution of the power spectrum u(t) of the environmental noise in the speech recognition interval is the same as that of the environmental noise in the noise observation interval Tn immediately before that speech recognition interval and that the distribution is a normal distribution, in the noise characteristic calculation section 13, a mean value (mean vector) .of the environmental noise and the variance (variance matrix) thereof are determined.

A mean vector μ' and a variance matrix Σ' can be determined based on the following equation (2):

$$\mu'(i) = \frac{1}{M}\sum_{i=1}^{M} y(t)(i) \quad (2)$$

$$\Sigma'(i,j) = \frac{1}{M}\sum_{i=1}^{M}(y(t)(i) - \mu'(i))(y(t)(j) - \mu'(j))$$

where the mean vector μ'(i) represents the i-th component of the mean vector μ' (i=1, 2, ..., D), y(t)(i) represents the i-th component of the feature vector of the t-th frame, and Σ'(i, j) represents the component of the i-th row and the j-th column of the variance matrix Σ' (j=1, 2, ..., D).

Here, in order to reduce the number of calculations, regarding the environmental noise, it is assumed that the components of the feature vector y are not in correlation with each other. In this case, as shown in the following equation, the variance matrix Σ' is 0 except for the diagonal components.

$$\Sigma'(i,j) = 0, \ i \neq j \quad (3)$$

In the noise characteristic calculation section 13, in a manner as described above, the mean vector μ' and the variance matrix Σ', which define the normal distribution, as the characteristics of the environmental noise, are determined, and these are supplied to the feature distribution parameter calculation section 12.

On the other hand, the output of the power spectrum analysis section 11, that is, the feature vector y of the produced speech containing environmental noise, is supplied to the feature distribution parameter calculation section 12. In the feature distribution parameter calculation section 12, a feature distribution parameter representing the distribution (distribution of estimated values) of the power spectrum of the true speech is calculated based on the feature vector y from the power spectrum analysis section 11 and the characteristics of the environmental noise from the noise characteristic calculation section 13.

More specifically, in the feature distribution parameter calculation section 12, assuming that the distribution of the power spectrum of the true speech is a normal distribution, the mean vector ξ thereof and the variance matrix Ψ thereof are calculated as feature distribution parameters based on the following equations (4) to (7):

$$\begin{aligned}\xi(t)(i) &= E[x(t)(i)] \quad (4)\\ &= E[y(t)(i) - u(t)(i)]\\ &= \int_0^{y(t)(i)} (y(t)(i) - u(t)(i))\frac{p(u(t)(i))}{\int_0^{y(t)(i)} P(u(t)(i))du(t)(i)} du(t)(i)\\ &= \frac{y(t)(i)\int_0^{y(t)(i)} P(u(t)(i))du(t)(i) - \int_0^{y(t)(i)} u(t)(i)P(u(t)(i))du(t)(i)}{\int_0^{y(t)(i)} P(u(t)(i))du(t)(i)}\\ &= y(t)(i) - \frac{\int_0^{y(t)(i)} u(t)(i)P(u(t)(i))du(t)(i)}{\int_0^{y(t)(i)} P(u(t)(i))du(t)(i)}\end{aligned}$$

-continued

When $i = j$, (5)

$$\Psi(t)(i, j) = V[x(t)(i)]$$
$$= E[(x(t)(i))^2] - (E[x(t)(i)])^2$$
$$(= E[(x(t)(i))^2] - (\xi(t)(i))^2)$$

When $i \neq j$,
$$\Psi(t)(i, j) = 0$$

$$E[(x(t)(i))^2] = E[(y(t)(i) - u(t)(i))^2] \quad (6)$$
$$= \int_0^{y(t)(i)} (y(t)(i) - u(t)(i))^2 \frac{p(u(t)(i))}{\int_0^{y(t)(i)} (y(t)(i)) du(t)(i)} du(t)(i)$$
$$= \frac{1}{\int_0^{y(t)(i)} P(u(t)(i)) du(t)(i)}$$
$$\times \left\{ (y(t)(i))^2 \int_0^{y(t)(i)} P(u(t)(i)) du(t)(i) - 2y(t)(i) \int_0^{y(t)(i)} u(t)(i) P(u(t)(i)) du(t)(i) + \int_0^{y(t)(i)} (u(t)(i))^2 P(u(t)(i)) du(t)(i) \right\}$$
$$= (y(t)(i))^2 - 2y(t)(i) \frac{\int_0^{y(t)(i)} u(t)(i) P(u(t)(i)) du(t)(i)}{\int_0^{y(t)(i)} P(u(t)(i)) du(t)(i)} + \frac{\int_0^{y(t)(i)} (u(t)(i))^2 P(u(t)(i)) du(t)(i)}{\int_0^{y(t)(i)} P(u(t)(i)) du(t)(i)}$$

$$P(u(t)(i)) = \frac{1}{\sqrt{2\pi\Sigma'(i, i)}} e^{-\frac{1}{2\Sigma'(i,i)}(u(t)(i) - \mu'(i))^2} \quad (7)$$

where $\xi(t)(i)$ represents the i-th component of the mean vector $\xi(t)$ in the t-th frame, $E[\ ]$ means a mean value within $[\ ]$, $x(t)(i)$ represents the i-th component of the power spectrum $x(t)$ of the true speech in the t-th frame, $u(t)(i)$ represents the i-th component of the power spectrum of the environmental noise in the t-th frame, and $P(u(t)(i))$ represents the probability that the i-th component of the power spectrum of the environmental noise in the t-th frame is $u(t)(i)$. Herein, since a normal distribution is assumed as the distribution of the environmental noise, $P(u(t)(i))$ can be expressed as shown in equation (7).

Furthermore, $\Psi(t)(i, j)$ represents the component of the i-th row and the j-th column of the variance $\Psi(t)$ in the t-th frame. In addition, $V[\ ]$ represents the variance within $[\ ]$.

In the feature distribution parameter calculation section 12, in a manner as described above, for each frame, the mean vector $\xi$ and the variance matrix $\Psi$ are determined as the feature distribution parameters representing the distribution (herein, the distribution in a case where the distribution in the feature vector space of the true speech is assumed to be a normal distribution) in the feature vector space of the true speech.

Thereafter, the feature distribution parameters determined in each frame of the speech recognition interval are output to the speech recognition section 6. That is, if the speech recognition interval is T frames and the feature distribution parameter determined in each of the T frames is denoted as $z(t)=\{\xi(t), \Psi(t)\}$ (t=1, 2, . . . , T), the feature distribution parameter calculation section 12 supplies the feature distribution parameter (sequence) $Z=\{z(1), z(2), \ldots, z(T)\}$ to the speech recognition section 6.

Referring again to FIG. 1, the speech recognition section 6 classifies the feature distribution parameter Z input from the feature extraction section 5 into one of a predetermined number K of sound models and one no-speech sound model and outputs the classified result as the recognition result of the input speech. That is, the speech recognition section 6 has stored therein, for example, an identification function (function for identifying whether the feature parameter Z is classified into a no-speech sound model) corresponding to a no-speech segment, and identification functions (functions for identifying whether the feature parameter Z is classified into any one of the sound models) corresponding to each of the predetermined number K of words, and calculates the value of the identification function of each sound model by using the feature distribution parameter Z from the feature extraction section 5 as an augment. Then, a sound model (word or no speech (noise)) in which the function value (what is commonly called a score) thereof is output as a recognition result.

Figure 4:
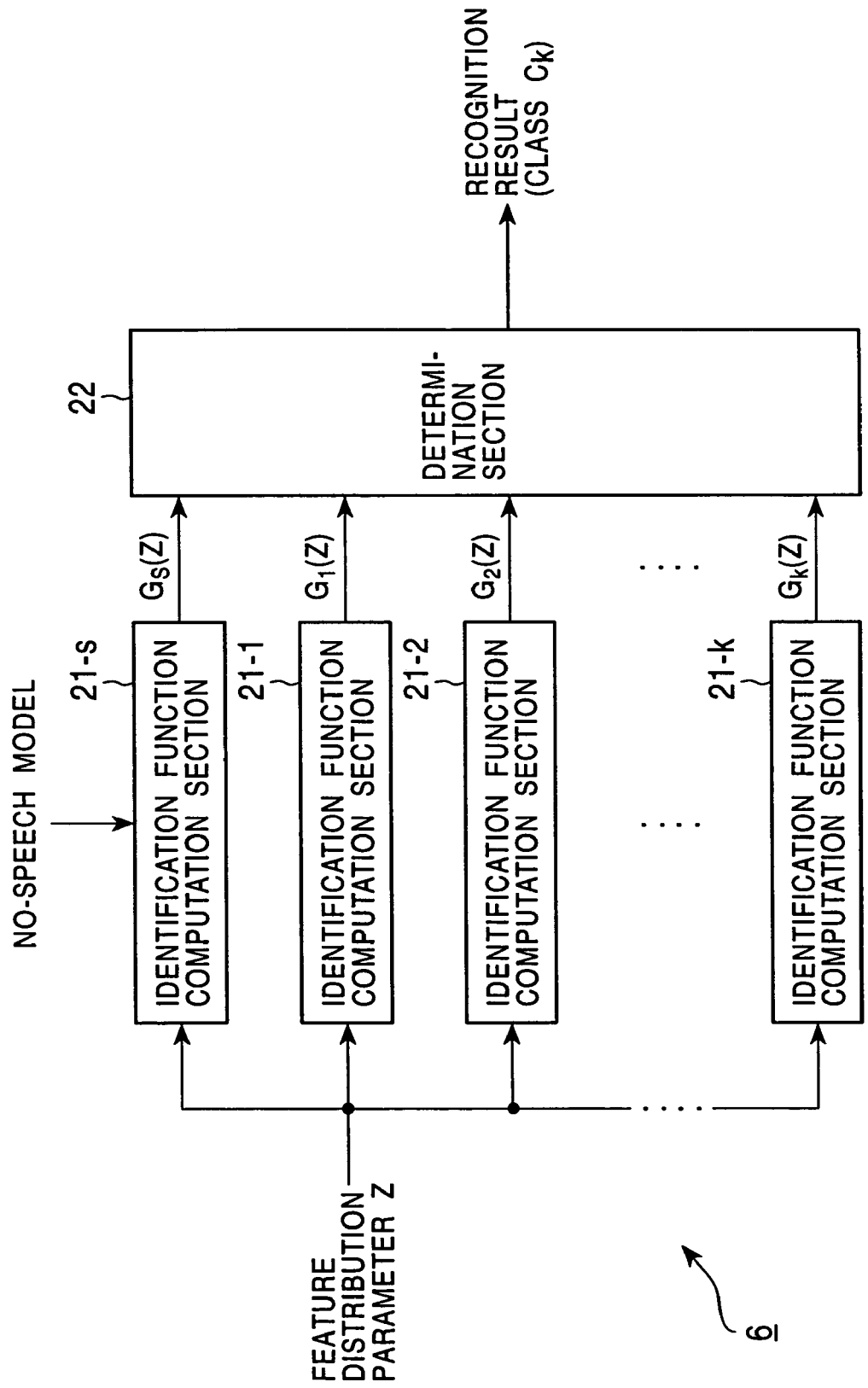
FIG. 4 is a block diagram showing a detailed example of the construction of a speech recognition section 6 of FIG. 1.

FIG. 4 shows a detailed example of the construction of the speech recognition section 6 of FIG. 1. The feature distribution parameter Z input from the feature distribution parameter calculation section 12 of the feature extraction section 5 is supplied to identification function computation sections 21-1 and 21-k and an identification function computation section 21-s. The identification function computation section 21-k (k=1, 2, . . . , K) has stored therein an identification function $G_k(Z)$ for identifying a word corresponding to the k-th sound model of K sound models, and computes the identification function $G_k(Z)$ by using the feature distribution parameter Z from the feature extraction section 5 as an augment. The identification function computation section 21-s has stored therein an identification function $G_s(Z)$ for identifying a no-speech segment corresponding to the no-speech sound model, and computes the identification function $G_s(Z)$ by using the feature distribution parameter Z from the feature extraction section 5 as an augment.

In the speech recognition section 6, identification (recognition) of a word or no speech as a class is performed by using, for example, an HMM (Hidden Markov Model) method.

Figure 5:
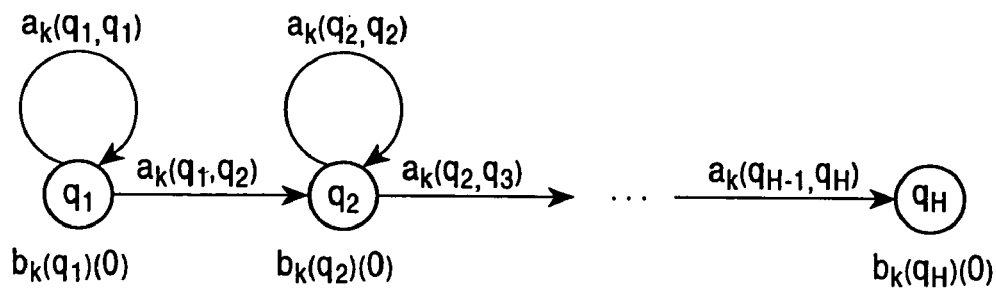
FIG. 5 is a diagram showing an HMM (Hidden Markov Model).

The HMM method will now be described with reference to FIG. 5. In FIG. 5, the HMM has H states $q_1$ to $q_H$, and for the state transition, only the transition to oneself and the transition to the state adjacent to the right are permitted. Furthermore, the initial state is set to be the leftmost state $q_1$, the final state is set to be the rightmost state $q_H$, and the state transition from the final state $q_H$ is prohibited. In a manner as described above, a model in which there is no transition to the state to the left of oneself is called a left-to-right model, and in the speech recognition, generally, a left-to-right model is used.

If a model for identifying a k class of the HMM is referred to as a k-class model, the k-class model is defined by, for example, a probability (initial state probability) $\pi_k(q_h)$ in which the model is initially in a state $q_h$, a probability (transition probability) $a_k(q_i, q_j)$ in which the model is in a state $q_i$ in a time (frame) t and transitions to a state $q_j$ at the next time t+1, and a probability (output probability) $b_k(q_i)$ in which the state $q_i$ outputs a feature vector O when the state transition occurs from the state $q_h$ (h=1, 2, . . . , H).

In a case where a feature vector sequence $O_1, O_2, \ldots$ is given, for example, the class of a model in which the probability (observation probability) at which such a feature vector sequence is observed is highest is assumed to be a recognition result of the feature vector sequence.

Herein, this observation probability is determined by the identification function $G_k(Z)$. That is, the identification function $G_k(Z)$ is given based on the following equation (8) by assuming that, in the optimum state sequence (the manner in which the optimum state transition occurs) with respect to the feature distribution parameter (sequence) $Z=\{z_1, z_2, \ldots, z_T\}$, the identification function $G_k(Z)$ determines the probability at which such a feature distribution parameter (sequence) $Z=\{z_1, z_2, \ldots, z_T\}$ is observed:

$$g_k(Z) = \max_{q1,q2,\ldots,qT} \pi_k(q_1) \cdot b'_k(q_1) \quad (8)$$
$$(z_1) \cdot a_k(q_1, q_2) \cdot b'_k(q_2)(z_2) \ldots a_k(q_{T-1}, q_T) \cdot b'_k(q_T)(z_T)$$

where $b_k'(q_i)(z_j)$ represents the output probability when the output is a distribution represented by $z_j$. For the output probability $b_k(s)(O_t)$ which is a probability at which each feature vector is output during a state transition, herein, a normal distribution function is used by assuming that there is no correlation among the components in the feature vector space. In this case, when the input is a distribution represented by $z_t$, the output probability $b_k'(s)(z_t)$ can be determined based on the following equation (9) by using a probability density function $P_k^m(s)(x)$ which is defined by the mean vector $\mu_k(s)$ and the variance matrix $\Sigma_k(s)$, and a probability density function $P^f(t)(x)$ representing the feature vector (here, the power spectrum) x of the t-th frame:

$$b'_k(s)(z_t) = \int p^f(t)(x) p_k^m(s)(x) dx \quad (9)$$
$$= \prod_{i=1}^{D} P(s)(i)(\xi(t)(i) \psi t)((i, i))$$
$$k = 1, 2, \ldots, K\!:\!s = q_1, q_2, \ldots, q_T\!:\!T = 1, 2, \ldots, T$$

where the integration interval of the integration in equation (9) is the entirety of the D-dimensional feature vector space (here, the power spectrum space).

Furthermore, in equation (9), $P(s)(i)(\xi(t)(i), \Psi(t)(i, i))$ is expressed based on the following equation (10):

$$P(s)(i)(\xi(t)(i), \Psi(t)(i, i)) = \quad (10)$$
$$\frac{1}{\sqrt{2\pi\pi(k(s)(i, i) + \psi(t)(i, i)}} e^{-\frac{(\mu_k(s)(i) - \xi(t)(i))^2}{2(\Sigma_k(s)(i,i) + \psi(t)(i,i))}}$$

where $\mu_k(s)(i)$ represents the i-th component of the mean vector $\mu_k(s)$, and $\Sigma_k(s)(i, i)$ represents the component of the i-th row and the i-th column of the variance matrix $\Sigma_k(s)$. The output probability of the k-class model is defined by these components.

The HMM, as described above, is defined by the initial state probability $\pi_k(q_h)$, the transition probability $a_k(q_i, q_j)$, and the output probability $b_k(q_i)(O)$. These probabilities are determined in advance by calculating a feature vector from the speech data for learning and by using the feature vector.

Herein, as the HMM, when that shown in FIG. 5 is used, since the transition always starts from the leftmost state $q_1$, only the initial state probability corresponding to the state $q_1$ is set to "1", and all the initial state probabilities corresponding to the other states are set to "0". Furthermore, as is clear from equations (9) and (10), if $\Psi(t)(i, i)$ is set to "0", the output probability matches the output probability in a continuous HMM in a case where the variance of the feature vector is not taken into account.

As a method of learning an HMM, for example, a Baum-Welch's reestimation method, etc., is known.

Referring again to FIG. 4, the identification function computation section 21-k (k=1, 2, ..., K) has stored therein, with respect to the k-class model, the identification function $G_k(Z)$ of equation (8) which is defined by the initial state probability $\pi_k(q_h)$ which is determined in advance by learning, the transition probability $a_k(q_i, q_j)$, and the output probability $b_k(q_i)(O)$. The identification function computation section 21-k computes the identification function $G_k(Z)$ by using the feature distribution parameter Z from the feature extraction section 5 as an augment, and outputs the function value (the above-described observation probability) $G_k(Z)$ thereof to a determination section 22. The identification function computation section 21-s has stored therein an identification function $G_s(Z)$ similar to the identification function $G_k(Z)$ of equation (8), which is determined by the initial state probability $\pi_s(q_h)$ supplied from the no-speech sound model correction section 7, the transition probability $a_s(q_i, q_j)$, and the output probability $b_s(q_i)(O)$. The identification function computation section 21-s computes the identification function $G_s(Z)$ by using the feature distribution parameter Z from the feature extraction section 5 as an augment, and outputs the function value (the above-described observation probability) $G_s(Z)$ thereof to the determination section 22.

In the determination section 22, with respect to the function value $G_k(Z)$ (it is assumed herein that it contains the function value $G_s(Z)$) from each of the identification function computation sections 21-1 and 21-k, and the identification function computation section 21-s, for example, by using the determination rule shown in the following equation (11), the feature distribution parameter Z, that is, the class (sound model) to which the input speech belongs, is identified:

$$C(Z) = C_k, \text{ if } G_k(Z) = \max_i \{G_i(Z)\} \quad (11)$$

where $C(Z)$ represents the function for performing an identification operation (process) for identifying a class to which the feature distribution parameter Z belongs, and furthermore, max in the right side of the second equation of equation (11) represents the maximum value of the function value $G_i(Z)$ (here, i=s, 1, 2, ..., K) which follows.

When the determination section 22 determines the class on the basis of equation (11), the determination section 22 outputs the class as a recognition result of the input speech.

Referring again to FIG. 1, the no-speech sound model correction section 7 creates the identification function $G_s(Z)$ corresponding to the no-speech sound model stored in the speech recognition section 6 on the basis of the environmental noise as the speech data in the, noise observation interval Tn, which is input from the noise observation interval extraction section 3, and supplies it to the speech-recognition section 6.

Specifically, in the no-speech sound model correction section 7, a feature vector X is observed with respect to each of M frames of the speech data (environmental noise) in the noise observation interval Tn, which is input from the noise observation interval extraction section 3, and the feature distribution thereof is created.

$$\{F_1(X), F_2(X), \ldots, F_M(X)\} \quad (12)$$

The feature distribution $\{F_i(X), i=1, 2, \ldots, M\}$ is a probability density function, and hereinafter is also referred to as a "no-speech feature distribution PDF".

Next, the no-speech feature distribution PDF is mapped into a probability distribution $F_s(X)$ corresponding to the no-speech sound model on the basis of equation (13).

$$F_s(X) = V(F_1(X), F_2(X), \ldots, F_M(X)) \quad (13)$$

where V is a correction function (mapping function) for mapping the no-speech feature distribution PDF$\{F_i(X), i=1, 2, \ldots, M\}$ into the no-speech sound model $F_s(X)$.

For this mapping, various methods can be conceived by the description of the no-speech feature distribution PDF, for example, $$F_s(x) = \sum_{i=1}^{M} \beta_i(F_1(X), F_2(X), \ldots, F_M(X), M) \cdot F_i(X) \quad (14)$$

$$= \sum_{i=1}^{M} \beta_i \cdot F_i(X) \quad (15)$$

where $\beta_i(F_1(X), F_2(X), \ldots, F_M(X), M)$ is a weighting function corresponding to each no-speech feature distribution and hereinafter is referred to as "$\beta_i$". The weighting function $\beta_i$ satisfies the conditions of the following equation (16):

$$\sum_{i=1}^{M} \beta_i(F_1(X), F_2(X), \ldots, F_M(X), M) = \sum_{i=1}^{M} \beta_i \equiv 1 \quad (16)$$

Here, if it is assumed that the probability distribution $F_s(X)$ of the no-speech sound model is a normal distribution and that the components which form the feature vector of each frame are not in correlation with each other, a covariance matrix $\Sigma_i$ of the no-speech feature distribution PDF$\{F_i(X), i=1, 2, \ldots, M\}$ is a diagonal matrix. However, the precondition for this assumption requires that the covariance matrix of the no-speech sound model also be a diagonal matrix. Therefore, if the components which form the feature vector of each frame are not in correlation with each other, the no-speech feature distribution PDF$\{F_i(X), i=1, 2, \ldots, M\}$ is a normal distribution $G(E_i, \Sigma_i)$ having a mean and a variance corresponding to each component. $E_i$ is the mean value of $F_i(X)$ (hereinafter also referred to as an "expected value") where appropriate, and $\Sigma_i$ is the covariance matrix of $F_i(X)$.

In addition, if the mean of the no-speech feature distribution corresponding to M frames of the noise observation interval Tn is denoted as $\mu_i$ and the variance thereof is denoted as $\sigma_i^2$, the probability density function of the no-speech feature distribution can be expressed by the normal distribution $G(\mu_i, \sigma_i^2)$ (i=1, 2, \ldots, M). Based on the above assumption, by using the mean $\mu_i$ and the variance $\sigma_i^2$ corresponding to each frame, it is possible to compute the normal distribution $G(\mu_s, \sigma_s^2)$ (corresponding to the above-described $G_s(Z)$) which approximates the no-speech sound model $F_S(X)$ by various methods described below.

The first method of computing the normal distribution $G(\mu_s, \sigma_s^2)$ of the no-speech sound model is a method in which the no-speech feature distribution $\{G(\mu_i, \sigma_i^2), i=1, 2, \ldots, M\}$ is used, and as shown in the following equation (17), the mean of all of $\mu_i$ is the mean value $\mu_s$ of the no-speech sound model, and as shown in the following equation (18), the mean of all of $\sigma_i^2$ is the variance $\sigma_s^2$ of the no-speech sound model:

$$\mu_s = \frac{a}{M} \sum_{i=1}^{M} \mu_i \quad (17)$$

$$\sigma_s^2 = \frac{b}{M} \sum_{i=1}^{M} \sigma_i^2 \quad (18)$$

where a and b are coefficients in which the optimum values are determined by simulation.

A second method of computing the normal distribution $G(\mu_s, \sigma_s^2)$ of the no-speech sound model is a method in which those of the no-speech feature distribution $\{G(\mu_i, \sigma_i^2); i=1, 2, \ldots, M\}$ having the expected value $\mu_i$ are used, and based on the following equations (19) and (20), the mean value $\mu_s$ of the no-speech sound model, and the variance $\sigma_s^2$ thereof are computed:

$$\mu_s = \frac{a}{M} \cdot \sum_{i=1}^{M} \mu_i \quad (19)$$

$$\sigma_s^2 = b \cdot \frac{1}{M} \cdot \sum_{i=1}^{M} \mu_i^2 - \mu_s^2 \quad (20)$$

where a and b are coefficients in which the optimum values are determined by simulation.

A third method of computing the normal distribution $G(\mu_s, \sigma_s^2)$ of the no-speech sound model is a method in which the mean value $\mu_s$ of the no-speech sound model and the variance $\sigma_s^2$ thereof are computed by a combination of the no-speech feature distribution $\{G(\mu_i, \sigma_i^2), i=1, 2, \ldots, M\}$.

In this method, the probability static of each no-speech feature distribution $G(\mu_i, \sigma_i^2)$ is denoted as $X_i$:

$$\{X_1, X_2, \ldots, X_M\} \quad (21)$$

Here, if the probability static of the normal distribution $G(\mu_s, \sigma_s^2)$ of the no-speech sound model is denoted as $X_s$, the probability static $X_s$ can be expressed by a linear combination of the probability static $X_i$ and the weighting function $\beta_i$, as shown in the following equation (22). The weighting function $\beta_i$ satisfies the condition of equation (16).

$$X_s = \sum_{i=1}^{M} \beta_i \cdot X_i \quad (22)$$

The normal distribution $G(\mu_s, \sigma_s^2)$ of the no-speech sound model can be expressed as shown in the following equation (23):

$$G(\mu_s, \sigma_s^2) = G\left(\sum_{i=1}^{M} \beta_i \mu_i, \sum_{i=1}^{M} \beta_i^2 \sigma_i^2\right) \quad (23)$$

In equation (23), the weighting function $\beta_i$ can generally be, for example, $1/M$. In this case, the mean value $\mu_s$ of equation (23) and the variance $\sigma_s^2$ thereof are determined by using predetermined coefficients, for example, as shown in the following equations.

$$\mu_s = \frac{a}{M} \cdot \sum_{i=1}^{M} \mu_i \quad (24)$$

$$\sigma_s^2 = \frac{b}{M^2} \cdot \sum_{i=1}^{M} \sigma_i^2 \quad (25)$$

where a and b are coefficients in which the optimum values are determined by simulation.

In a fourth method of computing the normal distribution $G(\mu_s, \sigma_s^2)$ of the no-speech sound model, a statistical population $\Omega_i = \{f_{i,j}\}$ corresponding to the probability static $X_i$ of the no-speech feature distribution $\{G(\mu_i, \sigma_i^2), i=1, 2, \ldots, M\}$ is assumed. Herein, if $\{N_i = N; i=1, 2, \ldots, M\}$ is assumed, the mean value $\mu_i$ can be obtained based on the following equation (26), and the variance $\sigma_i^2$ can be obtained based on the following equation (28):

$$\mu_i = \frac{1}{N} \sum_{j=1}^{M} f_{i,j} \quad (26)$$

$$\sigma_i^2 = \frac{1}{N} \sum_{j=1}^{M} (f_{i,j}^2 - \mu_j^2) \quad (27)$$

$$= \frac{1}{N} \sum_{j=1}^{M} f_{i,j}^2 - \mu_j^2 \quad (28)$$

By rearranging equation (28), the relationship of the following equation (29) holds:

$$\frac{1}{N} \sum_{j=1}^{M} f_{i,j}^2 = \sigma_i^2 + \mu_i^2 \quad (29)$$

Herein, if the sum $\Omega$ of the statistical population, $$\Omega = \bigcup_{i=1}^{M} \Omega_i,$$

is taken into account, the following equations (30) and (31) are derived from equation (26), and the following equations (32) to (34) are derived from equation (29):

$$\mu_s = \frac{1}{MN} \sum_{i=1}^{M} \sum_{j=1}^{N} f_{i,j} \quad (30)$$

$$= \frac{1}{M} \sum_{i=1}^{M} \mu_i \quad (31)$$

$$\sigma_s^2 = \frac{1}{MN} \sum_{i=1}^{M} \sum_{j=1}^{N} (f_{i,j} - \mu_s)^2 \quad (32)$$

$$= \frac{1}{MN} \sum_{i=1}^{M} \sum_{j=1}^{N} f_{i,j}^2 - \mu_s^2 \quad (33)$$

$$= \frac{1}{M} \sum_{i=1}^{M} (\sigma_i^2 + \mu_i^2) - \mu_s^2 \quad (34)$$

In practice, equations (31) and (34) are used by multiplying coefficients thereto:

$$\mu_s = \frac{a}{M} \sum_{i=1}^{M} \mu_i \quad (35)$$

$$\sigma_s^2 = b \cdot \left(\frac{1}{M} \sum_{i=1}^{M} (\sigma_i^2 + \mu_i^2) - \mu_s\right)^2 \quad (36)$$

where a and b are coefficients in which the optimum values are determined by simulation.

Furthermore, as shown in the following equation (37), a coefficient may be multiplied to only the variance $\sigma_s^2$.

$$\sigma_s^2 = \frac{b}{M} \sum_{i=1}^{M} \sigma_i^2 + \frac{1}{M} \sum_{i=1}^{M} \mu_i^2 - \mu_s^2 \quad (37)$$

Next, the operation of the speech recognition apparatus of FIG. 1 is described.

Speech data (produced speech containing environmental noise for the object of recognition) collected by the microphone 1 is input to the framing section 2, whereby the speech data is formed into frames, and the speech data of each frame is supplied, as an observation vector "a", to the noise observation interval extraction section 3 and the feature extraction section 5 in sequence. In the noise observation interval extraction section 3, speech data (environmental noise) in the noise observation interval Tn before timing $t_b$ at which the speech production switch 4 is turned on is extracted, and the speech data is supplied to the feature extraction section 5 and the no-speech sound model correction section 7.

In the no-speech sound model correction section 7, based on the environmental noise as the speech data in the noise observation interval Tn, updating (adaptation) of the no-speech sound model is performed by one of the above-described first to fourth methods, and the model is supplied to the speech recognition section 6. In the speech recognition section 6, an identification function corresponding to the no-speech sound model, which is stored up to that time, is updated by the identification function as the no-speech sound model supplied from the no-speech sound model correction section 7. That is, an adaptation of the no-speech sound model is performed.

In the feature extraction section 5, on the other hand, the speech data as the observation vector "a" from the framing section 2 is subjected to sound analysis in order to determine the feature vector y thereof. Furthermore, in the feature extraction section 5, based on the determined feature vector y, a feature distribution parameter Z representing the distribution in the feature vector space is calculated and is supplied to the speech recognition section 6. In the speech recognition section 6, by using the feature distribution parameter from the feature extraction section 5, the value of the identification function of the sound model corresponding to no speech and each of a predetermined number K of words is computed, and a sound model in which the function value thereof is a maximum is output as the recognition result of the speech.

As described above, since the speech data as the observation vector "a" is converted into a feature distribution parameter Z representing the distribution in the feature vector space which is a space of the features thereof, the feature distribution parameter is such that the distribution characteristics of noise contained in the speech data are taken into consideration. Furthermore, since the identification function corresponding to the no-speech sound model for identifying (recognizing) no speech is updated on the basis of the speech data in the noise observation interval Tn immediately before speech is produced, it is possible to greatly improve the speech recognition rate.

Figure 2:
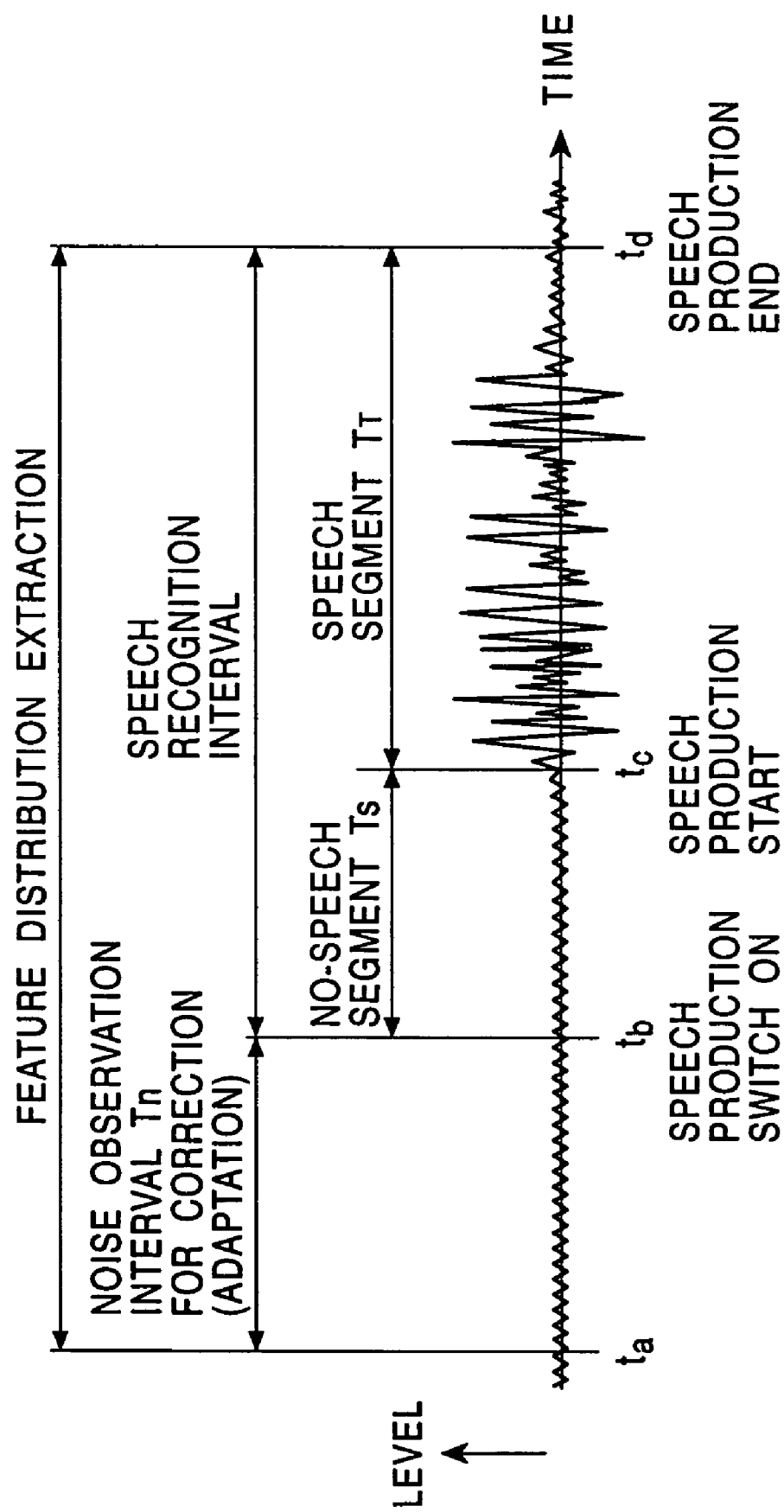
FIG. 2 is a diagram illustrating the operation of a noise observation interval extraction section 3 of FIG. 1.
Figure 6:
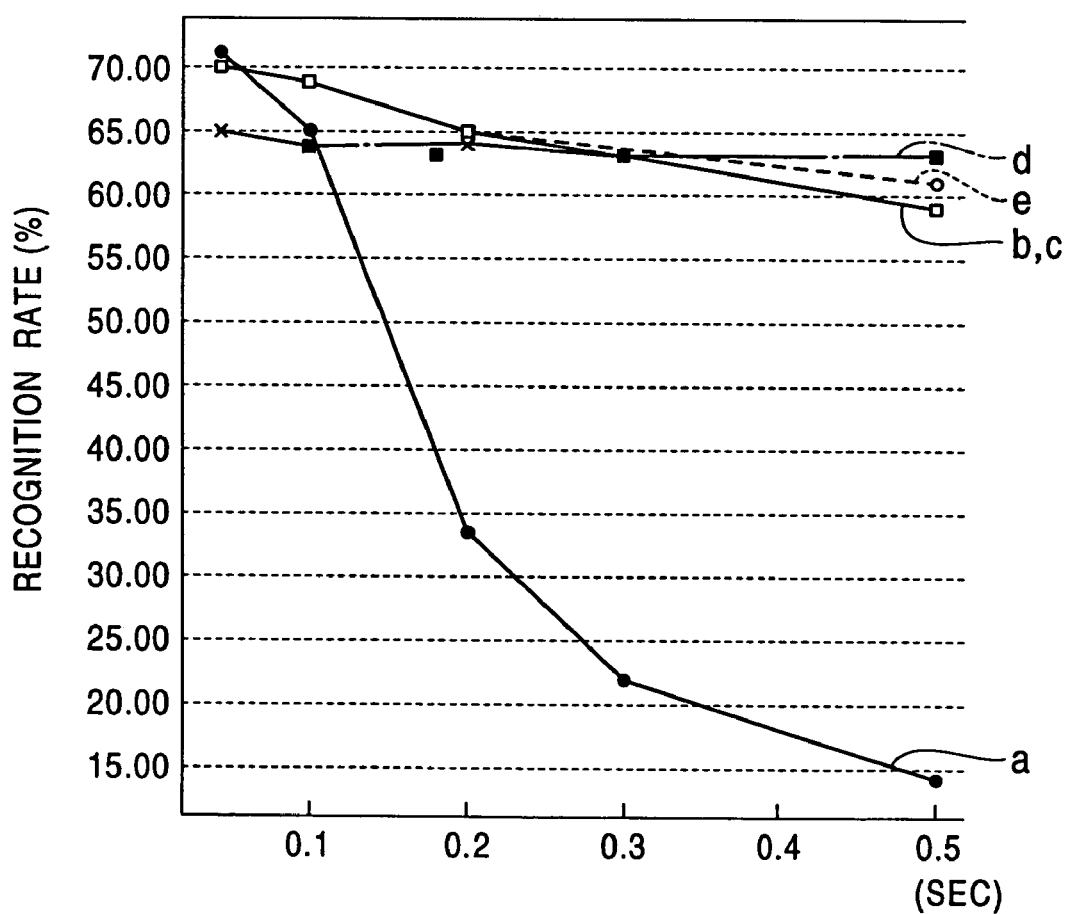
FIG. 6 is a diagram showing simulation results.
Figure 7:
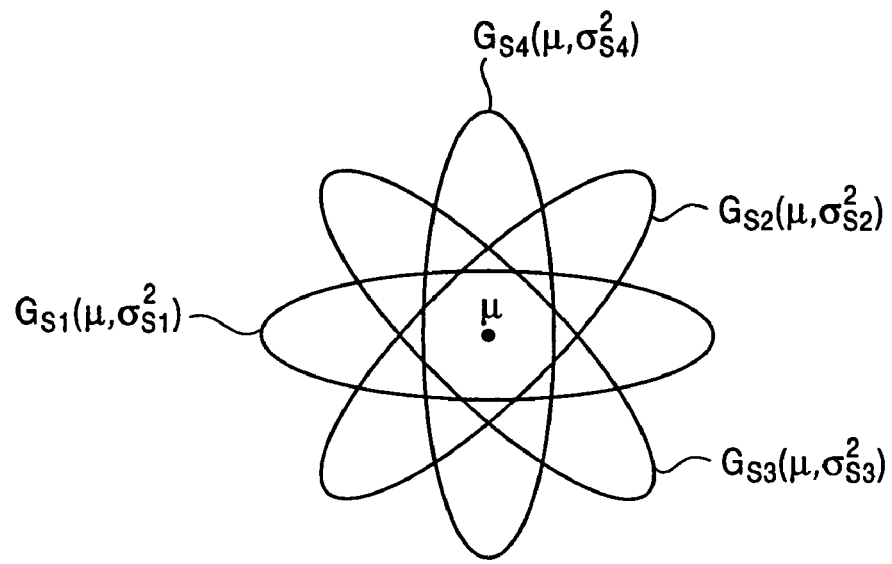
FIG. 7 is a diagram showing a normal distribution of a no-speech sound model.

FIG. 6 shows results of an experiment (simulation) in which the change of the speech recognition rate was measured when the no-speech segment Ts (see FIG. 2) from when the speech production switch 4 is turned on until speech is produced is changed.

In FIG. 6, the curve "a" shows results by a conventional method in which a no-speech sound model is not corrected (an adaptation of the no-speech sound model is not performed), the curve "b" shows results by the first method, the curve "c" shows results by the second method, the curve "d" shows results by the third method, and the curve "e" shows results by the fourth method.

The conditions of the experiment are as follows. The speech data used for recognition is collected within a car traveling on an expressway. The noise observation interval Tn is approximately 0.2 seconds in 20 frames. The no-speech segment Ts was set to 0.05, 0.1, 0.2, 0.3, and 0.5 seconds. In the extraction of the features of the speech data, analysis was performed (the features were obtained by MFCC (Mel-Frequency Cepstral Coefficients) analysis) in an MFCC domain. The number of people producing speech for the object of recognition is eight (four males and four females), and 303 words were spoken by each person. The number of words for which recognition was performed was 5000 words of Japanese. The sound model is an H and learning was performed in advance by using speech data prepared for learning. In the speech recognition, a viterbi search method was used, and the beam width thereof was set to 3000.

In the first, second, and fourth methods, the coefficient "a" was set to 1.0, and the coefficient "b" was set to 0.1. In the third method, the coefficient "a" was set to 1.0, and the coefficient "b" was set to 1.0.

As is clear from FIG. 6, in the conventional method (curve "a"), as the no-speech segment Ts is increased, the speech recognition rate is decreased considerably. In the first to fourth methods (curves "b" to "e") of the present invention, even if the no-speech segment Ts is increased, the speech recognition rate is decreased only slightly. That is, according to the present invention, even if the no-speech segment Ts is changed, it is possible for the speech recognition rate to be maintained at a particular level.

In each of the above-described first to fourth methods, the mean value $\mu_s$ which defines the normal distribution $G(\mu_s, \sigma_s^2)$ of the no-speech sound model becomes a mean value of the mean value $\mu_i$ of the no-speech feature distribution $G(\mu_i, \sigma_i^2)$ Therefore, for example, if the mean value of the mean value $\mu_i$ of the no-speech feature distribution $G(\mu_i, \sigma_i^2)$ is denoted as $\mu$, and the normal distributions of the no-speech sound models, determined by the first to fourth methods, are denoted as $G_{s1}(\mu, \sigma_{s1}^2)$, $G_{s2}(\mu, \sigma_{s2}^2)$, $G_{s3}(\mu, \sigma_{s3}^2)$, and $G_{s4}(\mu, \sigma_{s4}^2)$, respectively, these become distributions, in which the mean value $\mu$ is the center (center of gravity), in the feature space.

The adaptation of a no-speech sound model by the above-described first to fourth methods, based on the no-speech feature distribution $G(\mu_i, \sigma_i^2)$, can be defined by the following equation (38) by using a mapping V. Hereinafter, where appropriate, $G(\mu_i, \sigma_i^2)$ is described as $G_i$, and $G(\mu_s, \sigma_s^2)$ is described as $G_s$.

$$G_s(\cdot) = V(G_1, G_2, \ldots G_i, \ldots) \qquad (38)$$

Furthermore, herein, as the normal distribution G, a normal distribution is assumed, and the normal distribution is defined by a mean value and a variance. Therefore, if the mean value and the variance which define the normal distribution G are expressed by $\mu_s$ and $\sigma_s^2$ as described above, the definition of equation (38) can also be expressed by equations (39) and (40) by using the mappings $V_\mu$ and $V_{\sigma 2}$ of the mean value and the variance, respectively:

$$(\mu_s = V_\mu(G_1, G_2, \ldots) \qquad (39)$$

$$\sigma_s^2 = V_{\sigma 2}(G_1, G_2, \ldots) \qquad (40)$$

In the first to fourth methods expressed by the above-described mappings V ($V_\mu$ and $V_{\sigma 2}$), the no-speech feature distribution $G_1, G_2, \ldots, G_M$ in a time series, obtained from each of the M frames in the noise observation interval Tn (FIG. 2), is treated equally.

However, the environmental noise in the noise observation interval, strictly speaking, is not the same as the environmental noise in the noise observation interval Tn immediately before the noise observation interval, and furthermore, generally, it is estimated that the more distant from (the start time $t_c$ of) the speech recognition interval, the more the environmental noise in the noise observation interval Tn differs from the environmental noise in the speech recognition interval.

Therefore, the no-speech feature distribution $G_1, G_2, \ldots, G_M$ in a time series, obtained from each of the M frames in the noise observation interval Tn (see FIG. 2), should be treated by weighting to those which are nearer to the speech recognition interval, rather than being treated equally (those which are more distant from the speech recognition interval should be treated without being given a weight). As a result of the above, an adaptation (correction and updating) of a no-speech sound model, which further improves speech recognition accuracy, becomes possible.

Accordingly, regarding the no-speech feature distribution $G_1, G_2, \ldots, G_M$ obtained in the noise observation interval Tn, the degree of freshness representing the recentness thereof (here, corresponding to the recentness to the speech recognition interval) is introduced, and a method of performing an adaptation of a no-speech sound model by taking this freshness into account is described below.

Figure 8:
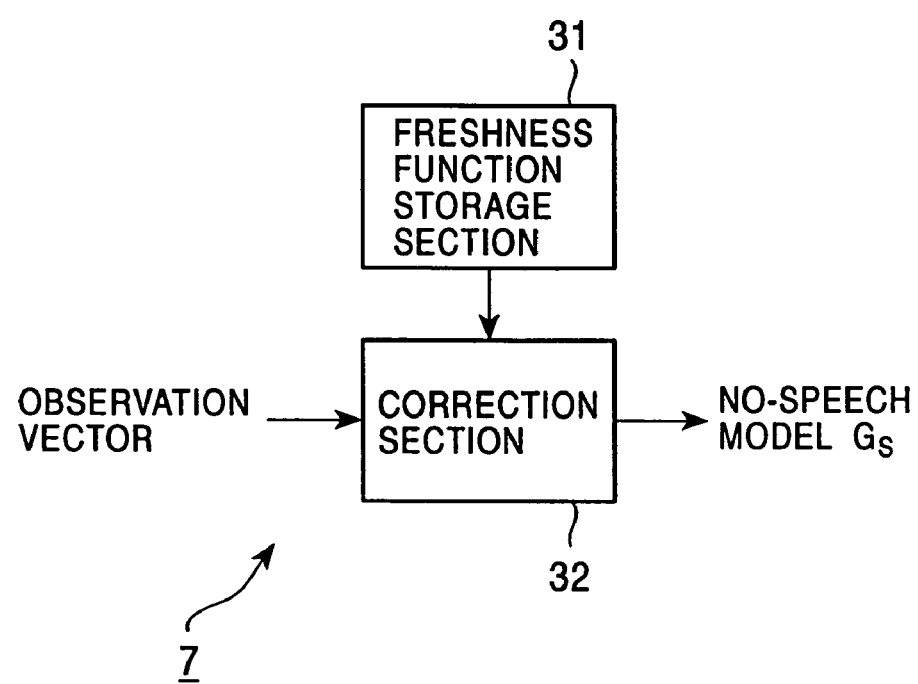
FIG. 8 is a block diagram showing an example of the construction of a no-speech sound model correction section 7 of FIG. 1.

FIG. 8 shows an example of the construction of the no-speech sound model correction section 7 of FIG. 1, which performs an adaptation of a no-speech sound model.

A freshness function storage section 31 has stored therein (parameters which define) a freshness function which is a function representing the degree of freshness such as that described above.

A sequence of observation vectors (here, speech data of M frames) as speech data (noise) in the noise observation interval Tn, output by the noise observation interval extraction section 3, is input to a correction section 32. The correction section 32 obtains a no-speech feature distribution $G_1, G_2, \ldots, G_M$ from this observation vector, and performs an adaptation of a no-speech sound model on the basis of this distribution and the freshness function stored in the freshness function storage section 31.

Figure 9:
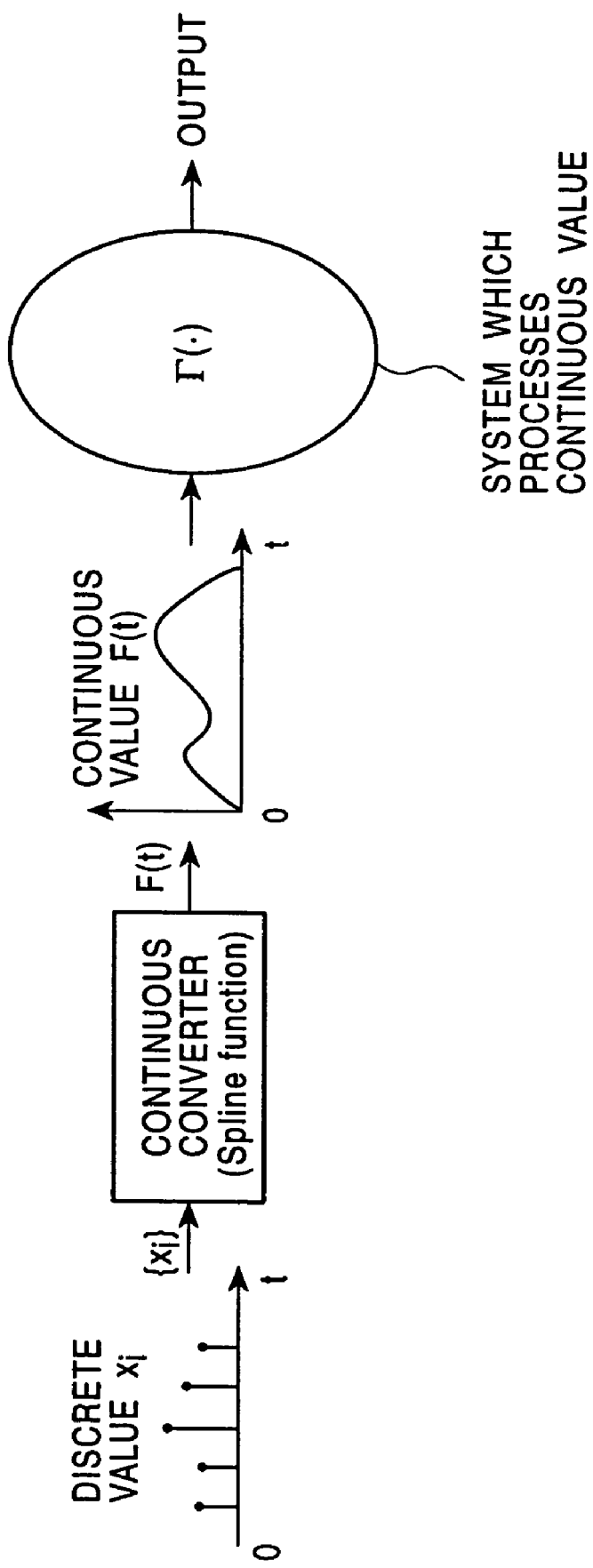
FIG. 9 is a diagram showing a state in which a discrete value is converted into a continuous value.

Herein, the no-speech feature distribution $G_1, G_2, \ldots, G_M$ contains discrete values observed in each of the M frames in the noise observation interval Tn. If the no-speech sound model correction section 7 is a system which processes discrete values, the no-speech feature distribution $G_1, G_2, \ldots, G_M$, which contains discrete values, can be used as it is. However, in a case where the no-speech sound model correction section 7 is a system which processes continuous values, for example, as shown in FIG. 9, it is necessary to convert the no-speech feature distribution $G_1, G_2, \ldots, G_M$, which contains discrete values, into continuous values by a continuous converter, after which the values are processed by the no-speech sound model correction section 7. As a method of converting discrete values into continuous values, for example, there is a method of performing an approximation by a spline function.

The discrete values are a finite number of observed values, observed at discrete times in a particular finite observation interval, and the continuous values are an infinite number of observed values, observed at arbitrary times, in a particular finite (or infinite) observation interval and are expressed by a particular function.

In a case where the no-speech feature distribution used for an adaptation of a no-speech sound model contains discrete values, the freshness function also becomes a function of discrete values, and in a case where the no-speech feature distribution contains continuous values, the freshness function also becomes a function of continuous values.

Next, a freshness function, and an adaptation of a no-speech sound model using the freshness function are described differently in a case where the freshness function contains discrete values and in a case where the freshness function contains continuous values.

First, a freshness function F(x) can be defined as shown in, for example, equations (41) to (43) below:

$$F(x)=0 \text{ if } x \notin \Omega_{obs} \quad (41)$$

$$F(x_2) \geq F(x_1) \text{ if } x_2 \geq x_1 \quad (42)$$

$$\int_{\Omega_{obs}} F(x)dx=1 \quad (43)$$

where $\Omega_{obs}$ represents the observation interval of the no-speech feature distribution, and in this embodiment, it corresponds to the noise observation interval Tn.

Figure 10:
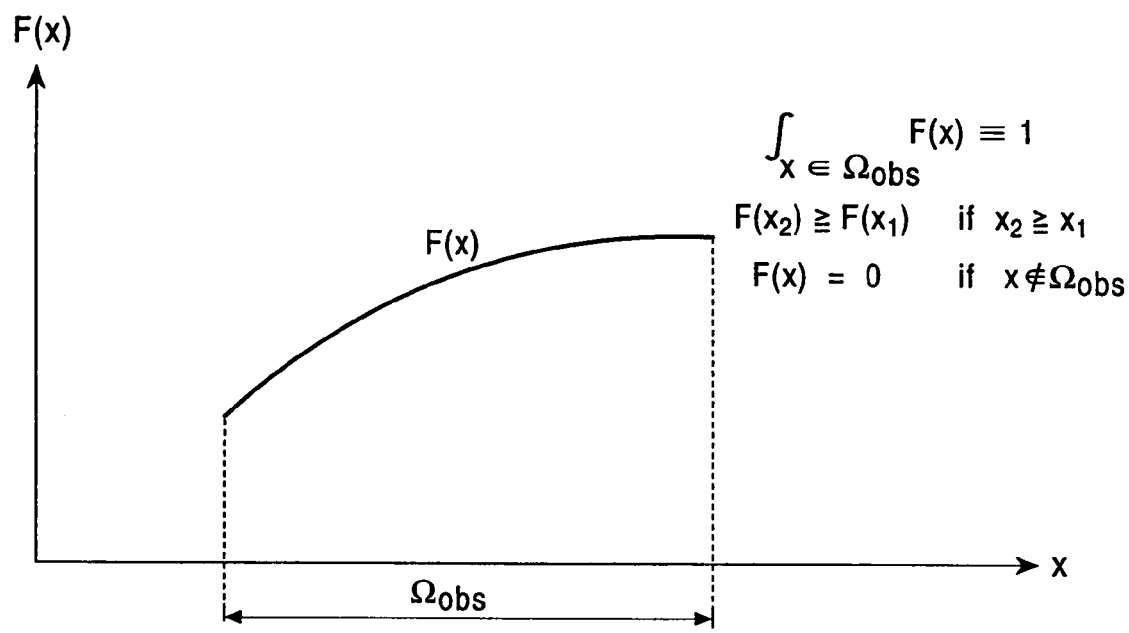
FIG. 10 is a diagram showing a general freshness function F(x).

Based on equation (41), the freshness function F(x) becomes 0 in other than the observation interval $\Omega_{obs}$. Furthermore, based on equation (42), the freshness function F(x) is fuction which increases as time elapses or which does not change (in this specification, referred to as a "monotonically increasing function") in the observation interval $\Omega_{obs}$. Therefore, basically, the nearer to the speech recognition interval (see FIG. 2), the larger the value of the freshness function F(x). Furthermore, based on equation (43), the freshness function F(x) is a function in which when an integration is performed over the observation interval $\Omega_{obs}$, the integrated value thereof becomes 1. Based on equations (41) to (43), the freshness function F(x) becomes, for example, such as that shown in FIG. 10.

Herein, in this embodiment, the freshness function F(x) is used as a multiplier to be multiplied to the no-speech feature distribution, as will be described later. Therefore, the freshness function F(x) acts as a weight with respect to the no-speech feature distribution to which the value of the function is multiplied as a multiplier when the value of the function is positive or negative. Furthermore, the freshness function F(x) acts so as to invalidate the no-speech feature distribution to which the value thereof is multiplied as a multiplier when the value is 0 so that no influence is exerted on the adaptation of the no-speech sound model.

In the correction section 32 of FIG. 8, by using the freshness function F(x) such as that described above and the no-speech feature distribution $G_1, G_2, \ldots, G_M$, basically, the no-speech sound model $G_s$ after adaptation can be determined based on equation (44):

$$G_s = V(G_1, \ldots, G_M) \quad (44)$$
$$= \sum_{x=1}^{M} F(x) \cdot G_x$$

According to equation (44), the no-speech feature distribution which is nearer to the speech recognition interval is treated by weighting, and an adaptation of a no-speech sound model is performed. As a result, it is possible to improve the speech recognition accuracy even more.

Next, a specific example of the freshness function F(x), and an adaptation of a no-speech sound model using it are described. In the following, it is assumed that the observation interval $\Omega_{obs}$ of the no-speech feature distribution (in this embodiment, the noise observation interval Tn) is an interval in which x is from 0 to $x_M$. Furthermore, as the function values of the freshness function F(x), the values of only the observation interval $\Omega_{obs}$ are considered (as shown in equation (41), since the function values are 0 in other than the observation interval $\Omega_{obs}$, in the following that point is not mentioned).

As the freshness function F(x), for example, a linear function can be used. In a case where continuous values are taken as the function values, the freshness function F(x) is expressed based on, for example, equation (45):

$$F(x)=\alpha \cdot x \quad (45)$$

$\alpha$ in equation (45) is a predetermined constant, and this constant $\alpha$ becomes $2/x_M^2$ on the basis of the definition of the freshness function of equation (43). Therefore, the freshness function F(x) of equation (45) is expressed based on equation (46):

$$F(x) = \frac{2}{x_M^2} \cdot x \quad (46)$$

Figure 11:
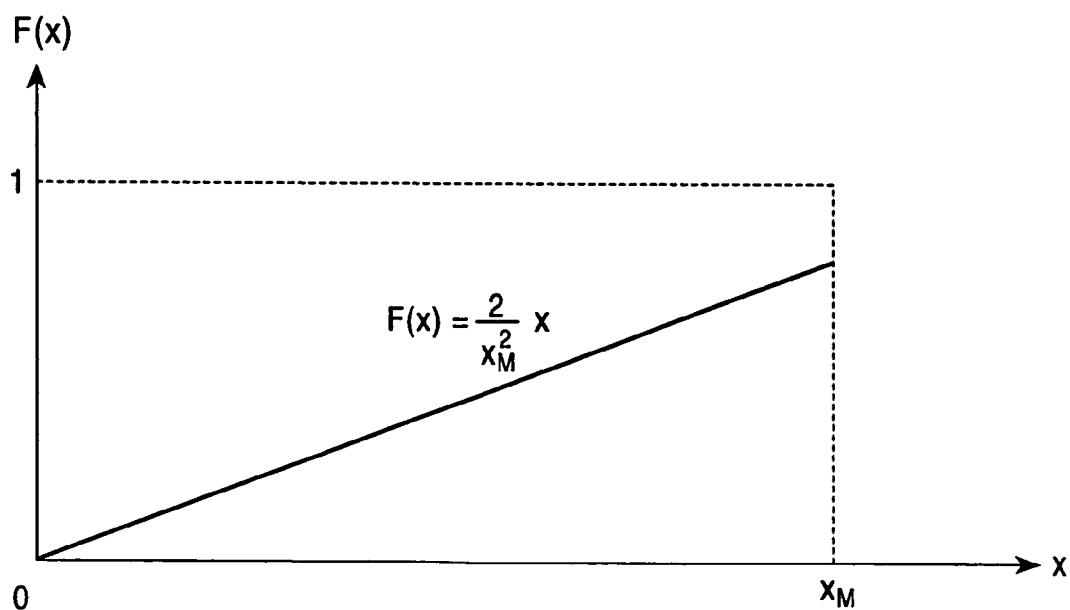
FIG. 11 is a diagram showing a first example of the freshness function F(x).

Here, the freshness function F(x) shown in equation (46) is shown in FIG. 11.

In this case, the no-speech sound model $G_s$ after adaptation is determined based on equation (47):

$$G_s = \frac{2}{x_M^2} \cdot \int_0^{x_M} x \cdot G_x(\mu_x, \sigma_x^2) dx \qquad (47)$$

where $G_x(\mu_i, \sigma_x^2)$ represents a no-speech feature distribution at time x, and $\mu_i$ and $\sigma_x^2$ are the mean value and the variance which define the normal distribution representing the no-speech feature distribution, respectively.

Next, as the freshness function F(x), for example, a linear function which takes discrete values can be used. In this case, the freshness function F(x) is expressed based on, for example, equation (48):

$$F(x) = \alpha \cdot x \quad x = 1, 2, \ldots, x_M \qquad (48)$$

α in equation (48) is a predetermined constant, and this constant α becomes $2/(x_M(x_M+1))$ on the basis of the definition of the freshness function of equation (43). Therefore, the freshness function F(x) of equation (48) is expressed based on equation (49):

$$F(x) = \frac{2 \cdot x}{x_M(x_M + 1)} \qquad (49)$$

Figure 12:
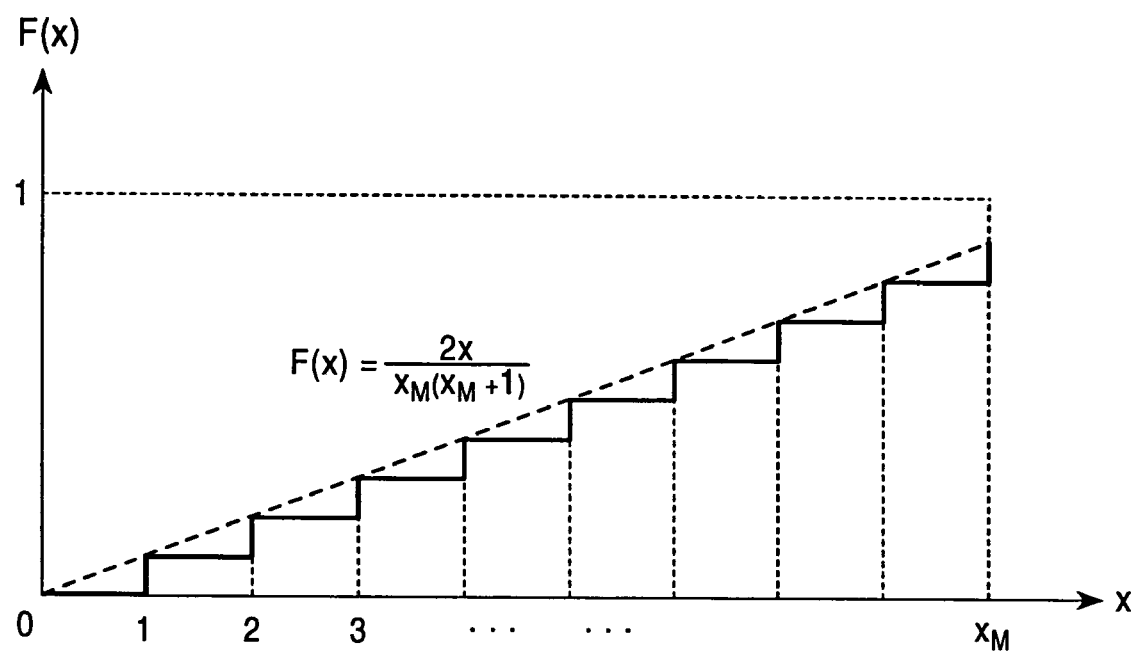
FIG. 12 is a diagram showing a second example of the freshness function F(x).

Herein, the freshness function F(x) expressed by equation (49) is shown in FIG. 12.

In this case, a no-speech sound model $G_s$ after adaptation is determined based on equation (50):

$$G_s = \sum_{x=1}^{x_M} \frac{2 \cdot x}{x_M(x_M + 1)} \cdot G_x \qquad (50)$$

where $G_x$ represents the no-speech feature distribution at a sample point (sample time) x.

Next, as the freshness function F(x), for example, a nonlinear function, such as an exponential function, a high-order binomial function, or a logarithmic function, can be used. In a case where as the freshness function F(x), for example, a second-order function as a high-order function which takes continuous values is used, the freshness function F(x) is expressed based on, for example, equation (51):

$$F(x) = \alpha \cdot x^2 \qquad (51)$$

α in equation (51) is a predetermined constant, and this constant α becomes $3/x_M^3$ on the basis of the definition of the freshness function of equation (43). Therefore, the freshness function F(x) of equation (51) is expressed based on equation (52):

$$F(x) = \frac{3}{x_M^3} \cdot x^2 \qquad (52)$$

Figure 13:
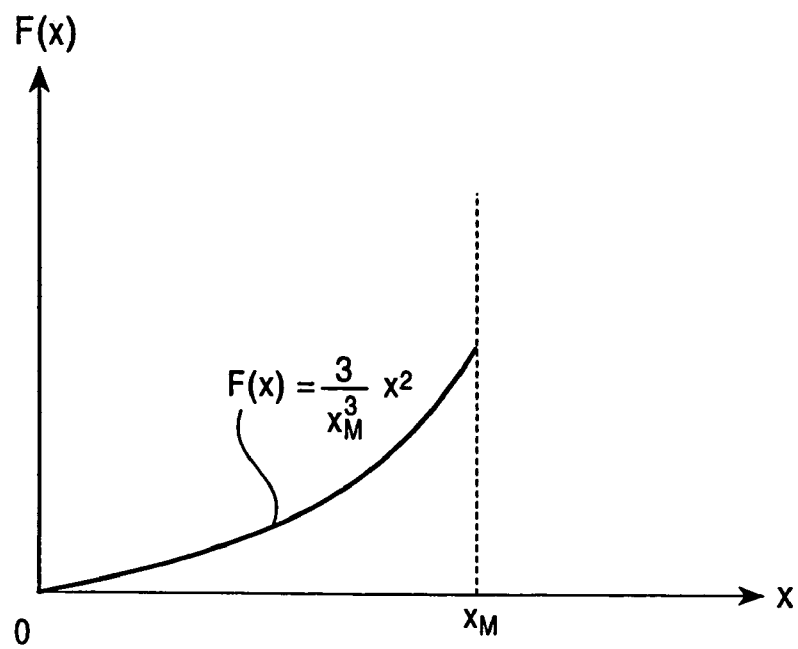
FIG. 13 is a diagram showing a third example of the freshness function F(x).

Herein, the freshness function F(x) expressed by equation (52) is shown in FIG. 13.

In this case, the no-speech sound model $G_s$ after adaptation is determined based on equation (53):

$$G_s = \frac{3}{x_M^3} \cdot \int_0^{x_M} x^2 \cdot G_x(\mu_x, \sigma_x^2) dx \qquad (53)$$

Next, as the freshness function F(x), for example, a second-order function as a high-order function which takes discrete values can be used. In this case, the freshness function F(x) is expressed based on, for example, equation (54):

$$F(x) = \alpha \cdot x_2 \quad x = 1, 2, \ldots, x_M \qquad (54)$$

α in equation (54) is a predetermined constant, and this constant α becomes $6/(x_M(x_M+1)(2x_M+1))$ on the basis of the definition of the freshness function of equation (43). Therefore, the freshness function F(x) of equation (54) is expressed based on equation (55):

$$F(x) = \frac{6 \cdot x^2}{x_M(x_M + 1)(2x_M + 1)} \qquad (55)$$

Figure 14:
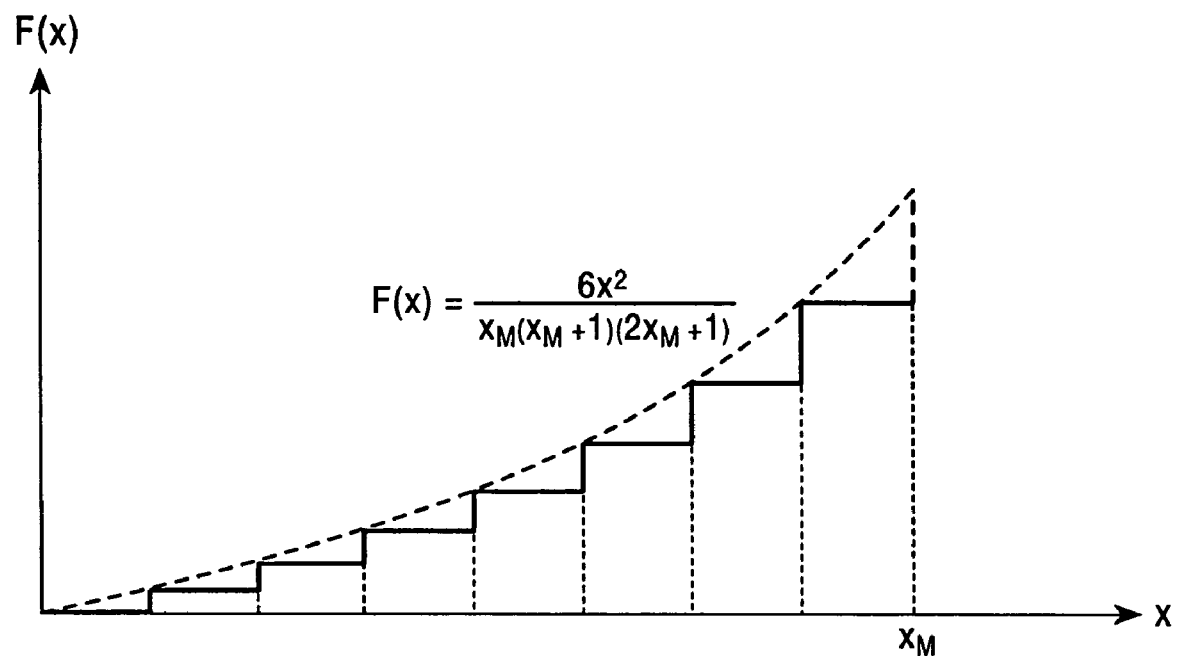
FIG. 14 is a diagram showing a fourth example of the freshness function F(x).

Herein, the freshness function F(x) expressed by equation (55) is shown in FIG. 14.

In this case, the no-speech sound model $G_s$ after adaptation is determined based on equation (56):

$$G_s = \sum_{i=1}^{x_M} \frac{6 \cdot x^2}{x_M(x_M + 1)(2x_M + 1)} \cdot G_x \qquad (56)$$

Next, in a case where as the freshness function F(x), for example, a logarithmic function which takes continuous values is used, the freshness function F(x) is expressed based on, for example, equation (57):

$$F(X) = \alpha \cdot \log(x+1) \qquad (57)$$

α in equation (57) is a predetermined constant, and this constant α becomes $1/((x_M+1)\log(x_M+1)-x_M)$ on the basis of the definition of the freshness function of equation (43). Therefore, the freshness function F(x) of equation (57) is expressed based on equation (58):

$$F(x) = \frac{1}{(x_M + 1)\log(x_M + 1) - x_M} \cdot \log(x + 1) \qquad (58)$$

Figure 15:
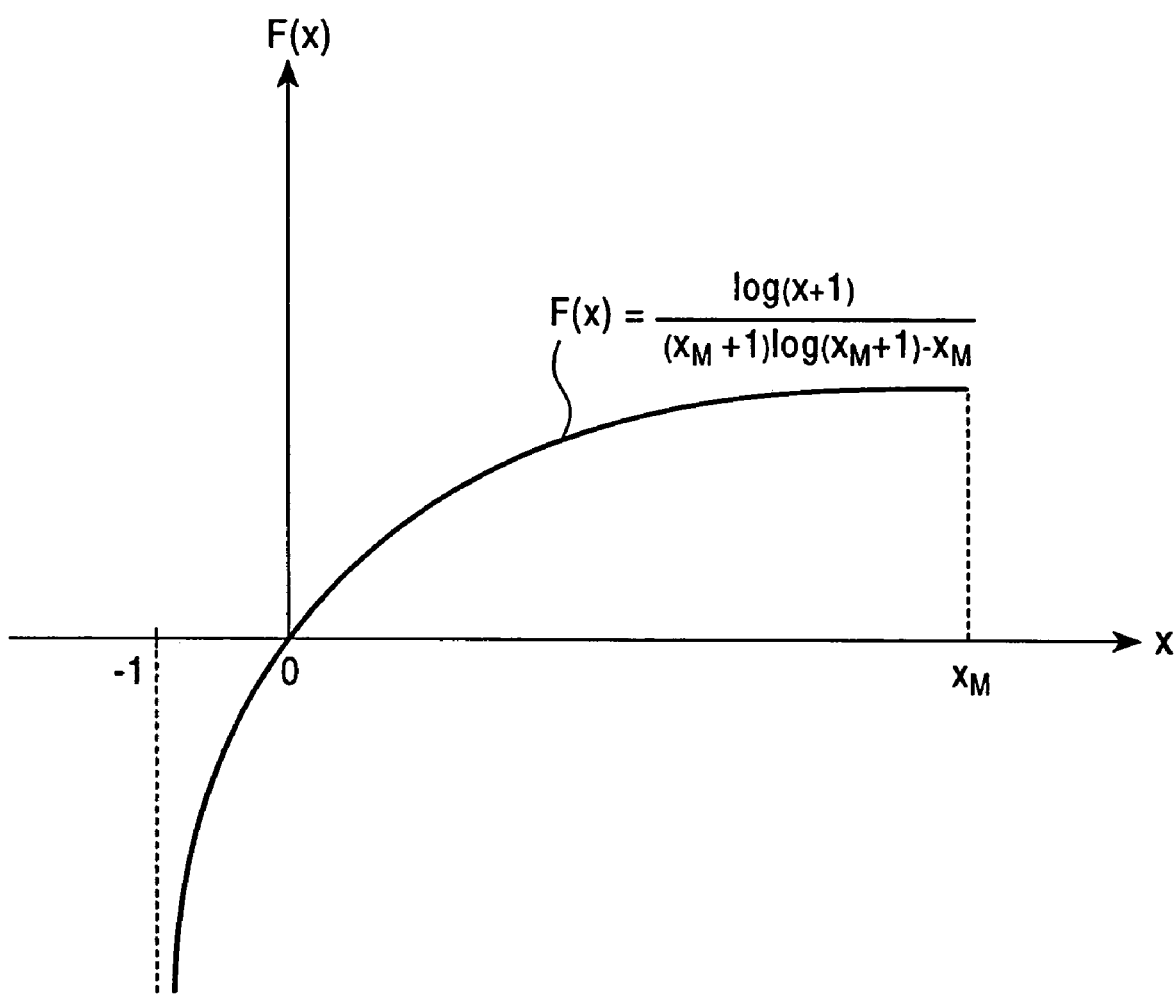
FIG. 15 is a diagram showing a fifth example of the freshness function F(x).

Herein, the freshness function F(x) expressed by equation (58) is shown in FIG. 15.

In this case, the no-speech sound model $G_s$ after adaptation is determined based on equation (59):

$$G_s = \frac{1}{(x_M + 1)\log(x_M + 1) - x_M} \cdot \int_0^{x_M} \log(x + 1) \cdot G_x(\mu_x, \sigma_x^2) dx \qquad (59)$$

Next, as the freshness function F(x), for example, a logarithmic function which takes discrete values can be used. In this case, the freshness function F(x) is expressed based on, for example, equation (60):

$$F(x) = \alpha \cdot \log(x+1) \quad x = 1, 2, \ldots, x_M \qquad (60)$$

α in equation (60) is a predetermined constant, and this constant α is determined on the basis of the definition of the freshness function of equation (43). Therefore, the freshness function F(x) of equation (60) is expressed based on equation (61):

$$F(x) = \frac{1}{\log \prod_{y=1}^{x_M} (y+1)} \cdot \log(x+1) \tag{61}$$

Figure 16:
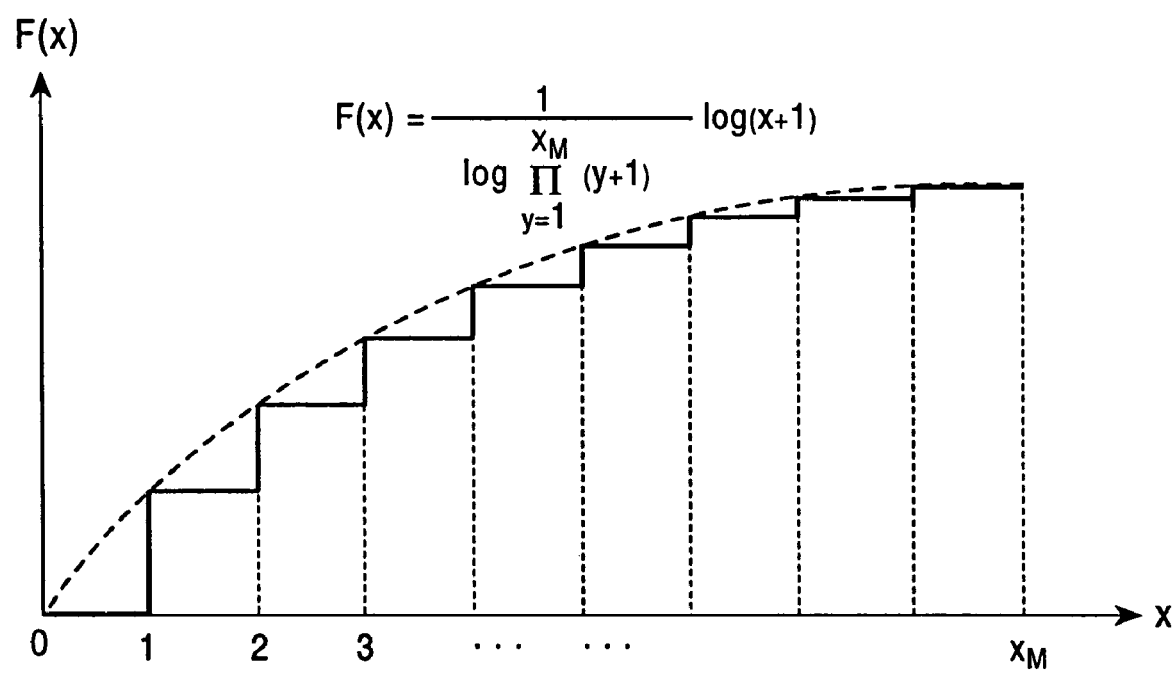
FIG. 16 is a diagram showing a sixth example of the freshness function F(x).

Herein, the freshness function F(x) expressed by equation (61) is shown in FIG. 16.

In this case, the no-speech sound model $G_s$ after adaptation is determined based on equation (62):

$$G_s = \frac{1}{\log \prod_{y=1}^{x_M} (y+1)} \cdot \sum_{x=1}^{x_M} \log(x+1) \cdot G_x \tag{62}$$

Next, in a case where as the freshness function F(x), for example, a general high-order function which takes continuous values is used, the freshness function F(x) is expressed based on, for example, equation (63):

$$F(x) = \alpha \cdot x^p \tag{63}$$

α in equation (63) is a predetermined constant, and the degree of the freshness function F(x) is determined by p.

The constant α can be determined on the basis of the definition of the freshness function of equation (43). Therefore, the freshness function F(x) of equation (63) is expressed based on equation (64):

$$F(x) = \frac{p+1}{x_M^{p+1}} \cdot x^p \tag{64}$$

In this case, the no-speech sound model Gs after adaptation is determined based on equation (65):

$$G_s = \frac{p+1}{x_M^{p+1}} \cdot \int_0^{x_M} x^p \cdot G_x(\mu_x, \sigma_x^2) dx \tag{65}$$

In equation (64), for example, when p is 1 or 2, the freshness function F(x) is a linear function or a second-order function which takes continuous values, and is expressed as shown in equation (46) or (52).

Furthermore, in equation (64), for example, when p is 3, the freshness function F(x) is a third-order function which takes continuous values and is expressed as shown in equation (66):

$$F(x) = \frac{4}{x_M^4} \cdot x^3 \tag{66}$$

Furthermore, in equation (64), for example, when p is 4, the freshness function F(x) is a fourth-order function which takes continuous values and is expressed as shown in equation (67):

$$F(x) = \frac{5}{x_M^5} \cdot x^4 \tag{67}$$

Next, in a case where as the freshness function F(x), for example, a general high-order function which takes discrete values is used, the freshness function F(x) is expressed based on, for example, equation (68):

$$F(x) = \alpha \cdot x^p \quad x = 1, 2, \ldots, x_M \tag{68}$$

α in equation (68) is a predetermined constant, and the order of the freshness function F(x) is determined by p.

The constant α can be determined on the basis of the definition of the freshness function of the equation (43). Therefore, the freshness function F(x) of equation (68) is expressed based on equation (69):

$$F(x) = \frac{x^p}{\sum_{y=1}^{x_M} y^p} \tag{69}$$

In this case, the no-speech sound model $G_s$ after adaptation is determined based on equation (70):

$$G_s = \frac{1}{\sum_{y=1}^{x_M} y^p} \cdot \sum_{x=1}^{x_M} \cdot G_x \tag{70}$$

In equation (69), for example, when p is 1 or 2, the freshness function F(x) is a linear function or a second-order function which takes discrete values, and is expressed as shown in equation (49) or (55).

In addition, in equation (69), for example, when p is 3, the freshness function F(x) is a third-order function which takes discrete values and is expressed as shown in equation (77):

$$F(x) = \frac{4x^3}{x_M^2(x_M+1)^2} \tag{71}$$

Furthermore, in equation (69), for example, when p is 4, the freshness function F(x) is a fourth-order function which takes discrete values and is expressed as shown in equation (72):

$$F(x) = \frac{4x^3}{x_M(x_M+1)(2x_M+1)(3x_M^2+3x_M-1)} \tag{72}$$

The concept of the freshness function F(x) can be applied to the adaptation of a no-speech sound model, and in addition, to adaptation to the person speaking in a noisy environment and to the adaptation of a sound model other than a no-speech sound model. In addition, it is also possible to apply the concept of the freshness function F(x) to speech detection and non-stationary noise detection. Furthermore, also in the field of sound signal processing, image signal processing, and communication, use of the concept of the freshness function F(x) makes it possible to improve robustness against environmental noise and to improve system performance.

In the foregoing, although a speech recognition apparatus to which the present invention is applied has been described, such a speech recognition apparatus can be applied to, for example, a car navigation apparatus capable of accepting speech input, and other various types of apparatuses.

In this embodiment, a feature distribution parameter in which distribution characteristics of noise are taken into consideration is determined. This noise includes, for example, noise from the outside in an environment in which speech is produced, and in addition, includes, for example, characteristics of a communication line in a case where speech is recognized which was transmitted via a telephone line or other communication lines.

Furthermore, the present invention can also be applied to a case in which, in addition to speech recognition, image recognition and other pattern recognitions are performed.

For instance, the teachings of the invention can also be transposed to pattern recognition systems and method in such application as:

object identification and sorting, e.g. in robotics computer-aided assembling, identification of persons or vehicles, etc.;
document authentification;
optical handwriting recognition,
etc.

In addition, although in this embodiment an adaptation of a no-speech sound model is performed by using a no-speech feature distribution represented as a distribution in a feature space, the adaptation of a no-speech sound model can also be performed by using features of noise represented as a point in a feature space.

Next, the above-described series of processing can be performed by hardware and can also be performed by software. In a case where the series of processing is performed by software, programs which form the software are installed into a general-purpose computer, etc.

Figure 17:
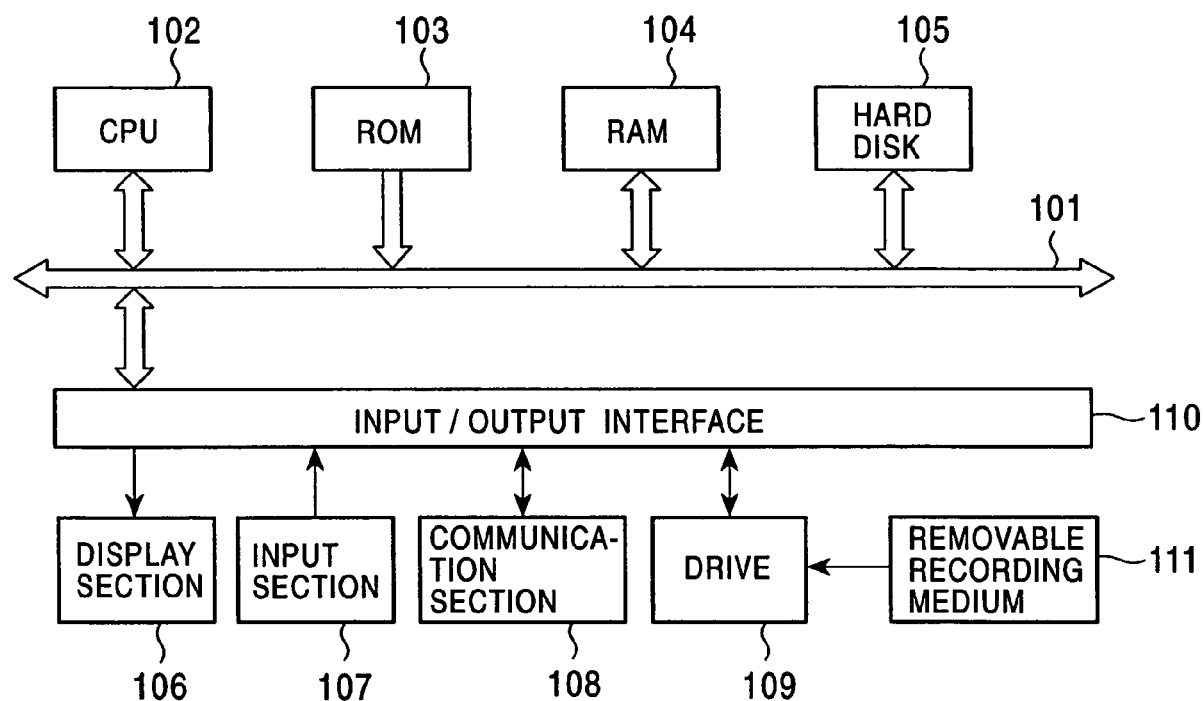
FIG. 17 is a block diagram showing an example of the construction of an embodiment of a computer according to the present invention.

Accordingly, FIG. 17 shows an example of the construction of an embodiment of a computer into which the programs which execute the above-described series of processing are installed.

The programs may be recorded in advance in a hard disk 105 or a ROM 103 as a recording medium contained in the computer.

Alternatively, the programs may be temporarily or permanently stored (recorded) in a removable recording medium 111, such as a floppy disk, a CD-ROM (Compact Disc Read Only Memory), an MO (Magneto-optical) disk, a DVD (Digital Versatile Disc), a magnetic disk, or a semiconductor memory. Such a removable recording medium 111 may be provided as what is commonly called package software.

In addition to being installed into a computer from the removable recording medium 111 such as that described above, programs may be transferred in a wireless manner from a download site via an artificial satellite for digital satellite broadcasting or may be transferred by wire to a computer via a network, such as a LAN (Local Area Network) or the Internet, and in the computer, the programs which are transferred in such a manner are received by a communication section 108 and are installed into the hard disk 105 contained therein.

The computer has a CPU (Central Processing Unit) 102 contained therein. An input/output interface 110 is connected to the CPU 102 via a bus 101. When a command is input as a result of the user operating an input section 107 formed of a keyboard, a mouse, etc., via the input/output interface 110, the CPU 102 executes a program stored in a ROM (Read Only Memory) 103 in accordance with the command. Alternatively, the CPU 102 loads a program stored in the hard disk 105, a program which is transferred from a satellite or a network, which is received by the communication section 108, and which is installed into the hard disk 105, or a program which is read from the removable recording medium 111 loaded into a drive 109 and which is installed into the hard disk 105, to a RAM (Random Access Memory) 104, and executes the program. As a result, the CPU 102 performs processing performed according to the constructions in-the above-described block diagrams.

Then, the CPU 102 outputs the processing result from a display section 106 formed of an LCD (Liquid Crystal Display), a speaker, etc., for example, via the input/output interface 110, as required, or transmits the processing result from the communication section 108, and furthermore, records the processing result in the hard disk 105.

Herein, in this specification, processing steps which describe a program for causing a computer to perform various types of processing need not necessarily perform processing in a time series along the described sequence as a flowchart and to contain processing performed in parallel or individually (for example, parallel processing or object-oriented processing) as well.

Furthermore, a program may be such that it is processed by one computer or may be such that it is processed in a distributed manner by plural computers. In addition, a program may be such that it is transferred to a remote computer and is executed thereby.

According to the model adaptive apparatus and the model adaptive method, the recording medium, and the pattern recognition apparatus of the present invention, an adaptation of a predetermined model is performed based on extracted data in a predetermined interval and the degree of freshness representing the recentness of the extracted data. Therefore, by performing pattern recognition using the model, it is possible to improve recognition performance.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements within the scope of the invention as hereafter claimed.

What is claimed is:

1. A model adaptive apparatus for performing an adaptation of a model used in pattern recognition which classifies input data in a time series into one of a predetermined number of models, said model adaptive apparatus comprising:

data extraction means for extracting said input data, corresponding to a predetermined model, which is observed in a predetermined interval, and for outputting the data as extracted data;

model adaptation means for performing an adaptation of said predetermined model on the basis of the extracted data in said predetermined interval and the degree of freshness representing the recentness of the extracted data, said freshness being a function whose value changes in a manner to correspond to the time-related position of said extracted data in said predetermined interval, wherein said pattern recognition is performed based on a feature distribution in a feature space of said input data and a monotonically increasing function that increases as time elapses;

feature extraction means for extracting the features of said input data;

storage means for storing a predetermined number of models into which said input data is to be classified; and classification means for classifying the features of said input data, corresponding to a predetermined model, which is observed in a predetermined interval, and for outputting the data as extracted data.

* * * * *